United States Patent
Debnath et al.

(10) Patent No.: US 12,530,692 B2
(45) Date of Patent: Jan. 20, 2026

(54) ARTIFICIAL INTELLIGENCE BASED METHODS AND SYSTEMS FOR IMPROVING ACCURACY OF AUTHORIZATION OPTIMIZER

(71) Applicant: MASTERCARD INTERNATIONAL INCORPORATED, Purchase, NY (US)

(72) Inventors: Ankur Debnath, Bongaigaon (IN); Ammar Ahmad Khan, Gautam Budh Nagar district (IN); Ankur Arora, New Delhi (IN); Anubhav Gupta, Lucknow (IN); Govind Vitthal Waghmare, Pune (IN); Hardik Wadhwa, White plains, NY (US); Lalasa Dheekollu, Visakhapatnam (IN); Siddhartha Asthana, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 63 days.

(21) Appl. No.: 18/473,737

(22) Filed: Sep. 25, 2023

(65) Prior Publication Data
US 2024/0119459 A1    Apr. 11, 2024

(30) Foreign Application Priority Data

Sep. 24, 2022   (IN) .............................. 202241054836

(51) Int. Cl.
*G06Q 20/40*    (2012.01)
*G06Q 20/38*    (2012.01)

(52) U.S. Cl.
CPC ......... *G06Q 20/405* (2013.01); *G06Q 20/389* (2013.01); *G06Q 20/401* (2013.01)

(58) Field of Classification Search
CPC .................................................. G06Q 20/405
See application file for complete search history.

(56) References Cited

U.S. PATENT DOCUMENTS 11,176,558 B1 * 11/2021 Cohn ................... G06Q 20/40

* cited by examiner

Primary Examiner — Edward Chang
(74) Attorney, Agent, or Firm — Barta Jones, PLLC

(57) ABSTRACT

Methods and server systems for improving accuracy of authorization optimizer are described herein. Method performed by server system includes receiving a Non-Sufficient Funds (NSF) error message from an acquirer server. Method includes accessing historical transaction data from a transaction database. The historical transaction data includes transaction related information associated with a plurality of users. Method includes generating a plurality of transaction features associated with the user based on the historical transaction data. Method includes determining via an authorization optimizer model, an optimal time slot from a plurality of time slots for the user based on the plurality of transaction features associated with the user. The optimal time slot indicates an optimal time window for the acquirer server to transmit an upcoming recurring payment request to the payment account of the user. Method includes facilitating transmission of a notification message including the optimal time slot to the acquirer server.

20 Claims, 12 Drawing Sheets

ARTIFICIAL INTELLIGENCE BASED METHODS AND SYSTEMS FOR IMPROVING ACCURACY OF AUTHORIZATION OPTIMIZER

CROSS-REFERENCE TO RELATED APPLICATION

This application claims the benefit of, and priority to, India Provisional Patent Application No. 202241054836, filed Sep. 24, 2022. The entire disclosure of the above application is incorporated herein by reference.

FIELD OF THE INVENTION

The present disclosure relates to artificial intelligence processing systems and, more particularly to, electronic methods and complex processing systems for performing authorization of payment transactions with increased accuracy based at least on rank consistent ordinal regression.

BACKGROUND

In most financial transactions, a buyer (such as a cardholder) makes a payment to a merchant in exchange for goods, services, etc. For some goods or services (e.g., subscription services), the buyer needs to make payment to the merchant periodically (e.g., weekly, monthly, yearly, etc.). In such cases, the buyer can opt-in for a recurring payment option for their convenience. Generally, recurring payments are individual payments generated at set intervals from a standing instruction (SI). Generally, SI is a service offered to buyers or cardholders of a financial institution (e.g., a bank), wherein a set amount is deducted at regular intervals from a payment account of the cardholder. The payment may get deducted via any payment mode (e.g., payment account, payment card such as credit card, debit card, etc.).

In general, whenever a cardholder opts in for a recurring payment option, the cardholder allows the merchant to store the payment information of the cardholder. In addition, the cardholder may give an order (i.e., SI) to debit money from their payment account periodically, i.e., a set amount is debited weekly, monthly, annually, and so on. The payment amount is then debited from the payment account of the cardholder (i.e., associated with an issuer bank) and credited to the payment account of the merchant (i.e., associated with an acquirer bank) with the facilitation of a payment network in between. It is noted that the payment transaction is performed successfully only if sufficient funds are present in the payment account of the cardholder.

In case sufficient funds are not present in the payment account of the cardholder, the payment transaction may attract a non-sufficient funds (NSF) decline error, i.e., the payment transaction may fail due to non-sufficient funds (i.e., insufficient balance) in the payment account of the cardholder. Further, the merchants may re-try to process the recurring payment transaction since the merchants are unaware that sufficient funds are not available in the payment account of the cardholders. However, re-trying to process the recurring payment transaction may lead to an increase in decline rates and create unnecessary traffic on the network. Moreover, authorization declines are throttled on the network at high frequency eroding existing fraud model performance and analytics.

In view of the above discussion, there exists a technological need for performing authorization of payment transactions with increased accuracy.

SUMMARY

Various embodiments of the present disclosure provide methods and systems for improving the accuracy of the authorization process based on techniques such as ordinal regression and deep learning models.

In an embodiment, a computer-implemented method for determining an optimal time slot for performing an upcoming recurring payment transaction is disclosed. The computer-implemented method performed by a server system includes receiving a Non-Sufficient Funds (NSF) error message from an acquirer server associated with a merchant. Herein, the NSF error message indicates that funds are not available in a payment account of a user to complete a recurring payment transaction with the merchant. The method further includes accessing historical transaction data from a transaction database. Herein, the historical transaction data includes transaction related information associated with a plurality of users. The method further includes generating a plurality of transaction features associated with the user based, at least in part, on the historical transaction data. The method further includes determining via an authorization optimizer model, an optimal time slot from a plurality of time slots for the user based, at least in part, on the plurality of transaction features associated with the user. Herein, the optimal time slot indicates an optimal time window for the acquirer server to transmit an upcoming recurring payment request to the payment account of the user. The method further includes facilitating the transmission of a notification message to the acquirer server. Herein, the notification message includes the optimal time slot for the user.

In another embodiment, a server system is disclosed. The server system includes a communication interface and a memory including executable instructions. The server system also includes a processor communicably coupled to the memory. The processor is configured to execute the instructions to cause the server system, at least in part, to receive a Non-Sufficient Funds (NSF) error message from an acquirer server associated with a merchant. Herein, the NSF error message indicates that funds are not available in a payment account of a user to complete a recurring payment transaction with the merchant. The server system is further caused to access historical transaction data from a transaction database. Herein, the historical transaction data includes transaction related information associated with a plurality of users. The server system is further caused to generate a plurality of transaction features associated with the user based, at least in part, on the historical transaction data. The server system is further caused to determine via an authorization optimizer model, an optimal time slot from a plurality of time slots for the user based, at least in part, on the plurality of transaction features associated with the user. Herein, the optimal time slot indicates an optimal time window for the acquirer server to transmit an upcoming recurring payment request to the payment account of the user. The server system is further caused to facilitate the transmission of a notification message to the acquirer server. Herein, the notification message includes the optimal time slot for the user.

In yet another embodiment, a non-transitory computer-readable storage medium is disclosed. The non-transitory computer-readable storage medium includes computer-executable instructions that, when executed by at least a processor of a server system, cause the server system to perform a method. The method includes receiving a Non-Sufficient Funds (NSF) error message from an acquirer server associated with a merchant. Herein, the NSF error message indicates that funds are not available in a payment account of a user to complete a recurring payment transaction with the merchant. The method further includes accessing historical transaction data from a transaction database. Herein, the historical transaction data includes transaction related information associated with a plurality of users. The method further includes generating a plurality of transaction features associated with the user based, at least in part, on the historical transaction data. The method further includes determining via an authorization optimizer model, an optimal time slot from a plurality of time slots for the user based, at least in part, on the plurality of transaction features associated with the user. Herein, the optimal time slot indicates an optimal time window for the acquirer server to transmit an upcoming recurring payment request to the payment account of the user. The method further includes facilitating the transmission of a notification message to the acquirer server. Herein, the notification message includes the optimal time slot for the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present technology, reference is now made to the following descriptions taken in connection with the accompanying drawings in which.

Figure 1:
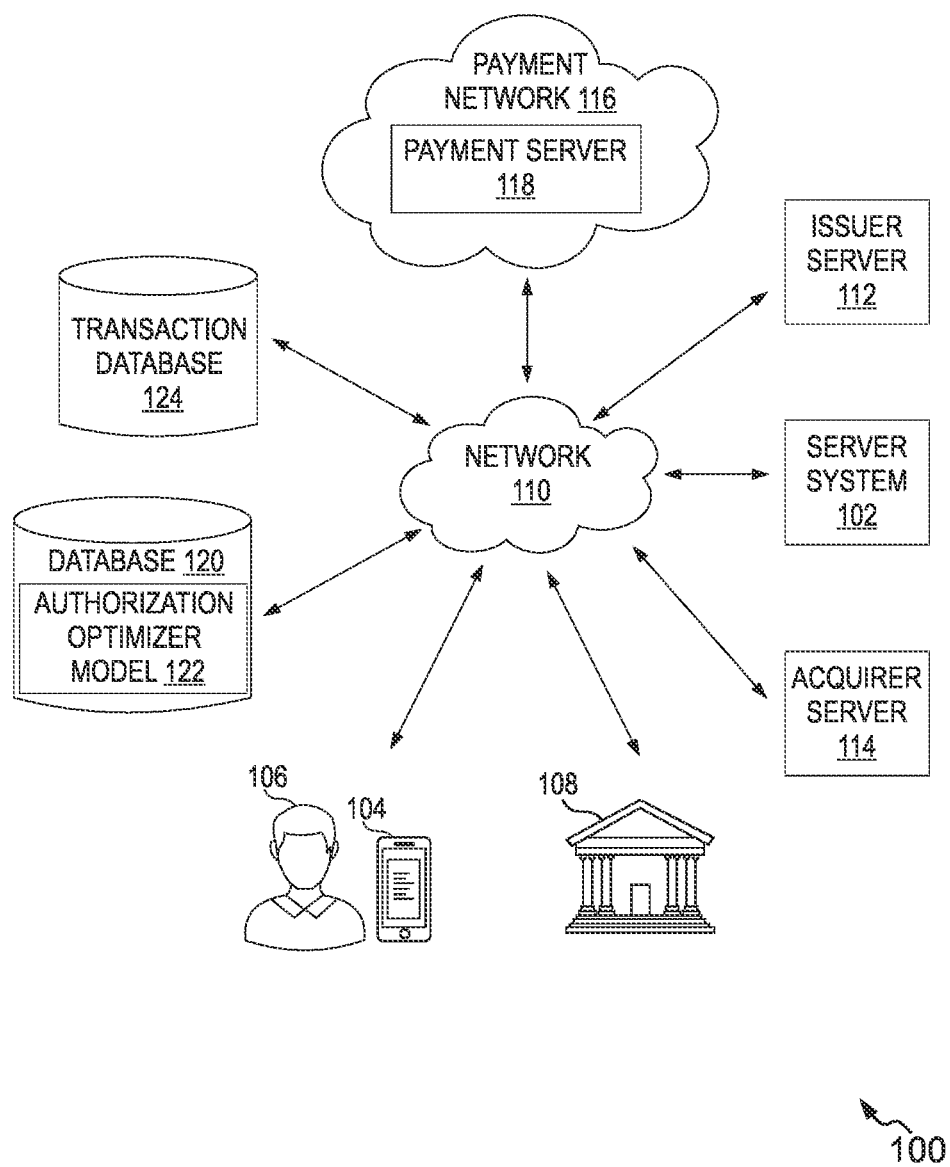
FIG. 1 illustrates an exemplary representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification does not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund a financial transaction (interchangeably referred to as "recurring payment transaction"). Examples of financial accounts include, but are not limited to a savings account, a credit account, a checking account, and a virtual payment account. The financial account may be associated with an entity such as an individual person, a family, a commercial entity, a company, a corporation, a governmental entity, a non-profit organization, and the like. In some scenarios, a financial account may be a virtual or temporary payment account that can be mapped or linked to a primary financial account, such as those accounts managed by payment wallet service providers, and the like.

The term "payment network", used herein, refers to a network or collection of systems used for the transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by such as, Mastercard®.

The term "merchant", used throughout the description generally refers to a seller, a retailer, a purchase location, an organization, or any other entity that is in the business of selling goods or providing services, and it can refer to either a single business location or a chain of business locations of the same entity.

The terms "cardholder", "consumer", "user", and "buyer" are used interchangeably throughout the description and refer to a person who holds a payment card (e.g., credit card, debit card, etc.) that will be used by a merchant to perform a card-on-file payment transaction.

The terms "recurring payment transaction", "recurring payment", and "recurring transaction" are used interchangeably throughout the description and refer to a payment transaction that is set for a fixed amount and performed periodically in exchange for goods or services offered to a cardholder on a periodic basis. For example, information on the payment card of the cardholder is stored and recalled at the time of the transaction, and also attached with the payment transaction for processing through the payment network. The information on the payment card may be stored on file, and then used periodically to perform recurring payment transactions.

OVERVIEW

Various embodiments of the present disclosure provide methods, systems, user devices, and computer program products for determining an optimal time slot for performing an upcoming recurring payment transaction.

In an embodiment, a server system that may be a payment server associated with a payment network is configured to receive a Non-Sufficient Funds (NSF) error message from an acquirer server associated with a merchant. In an implementation, the NSF error message indicates that funds are not available in a payment account of a user to complete a recurring payment transaction with the merchant. In another embodiment, the server system is further configured to access historical transaction data from a transaction database. Herein, the historical transaction data includes transaction related information associated with a plurality of users. In various non-limiting examples, the transaction related information may further include a date of a recurring payment transaction, an amount of recurring payment transaction, a recurring payment decline due to NSF, a number of days after which a successful recurring payment was performed after NSF decline, and the like.

In another embodiment, the server system is further configured to generate a plurality of transaction features associated with the user based, at least in part, on the historical transaction data. In various non-limiting examples, the plurality of transaction features may include transaction velocity features for an Automatic Teller Machine (ATM), a Point of Sale (POS) device, electronic commerce-based payment transactions for the user, spending patterns in merchant industries, cross-border transaction pattern, location pattern data related to the payment transactions, card product type, and the like. Further, the server system is configured to determine via an authorization optimizer model, an optimal time slot from a plurality of time slots for the user based, at least in part, on the plurality of transaction features associated with the user. Herein, the optimal time slot indicates an optimal time window for the acquirer server to transmit an upcoming recurring payment request to the payment account of the user. In various non-limiting examples, the authorization optimizer model may be implemented as a gradient boosting model (GBM), a long short-term memory (LSTM) model, and the like. In particular, the server system is configured to convert the plurality of transaction features into a plurality of feature vectors. Then, the server system is configured to determine via the authorization optimizer model, the optimal time slot from the plurality of time slots for the user based, at least in part, on the plurality of feature vectors.

In another embodiment, the server system is configured to train the authorization optimizer model based, at least in part, on performing a set of operations iteratively till a loss function of the authorization optimizer model saturates. It is noted that the loss function is considered to be saturated when the value generated by the loss function between subsequent iterations either minimizes, reaches a predefined stable value (i.e., saturation), or becomes constant. The set of operations performed by the server system includes accessing a training dataset associated with the plurality of users from the transaction dataset. The set of operations further includes initializing the authorization optimizer model based, at least in part, on one or more network parameters. Herein, the authorization optimizer model includes a Recurrent Neural Network (RNN) layer, a self-attention layer, and a classification layer. The set of operations further includes generating a plurality of training features for each user of the plurality of users based, at least in part, on the training dataset. The set of operations further includes converting the plurality of training features into a plurality of training vectors. The set of operations further includes determining via the authorization optimizer model, a predicted optimal time slot based, at least in part, on the plurality of training vectors. The set of operations further includes updating the one or more network parameters based, at least in part, on a loss function. It is noted that the loss function is described later within the present disclosure.

Various embodiments of the present disclosure provide multiple advantages and technical effects while addressing technical problems such as how to determine an optimal time slot for performing an upcoming recurring transaction or how to improve the accuracy of the authorization optimizer model. To that end, the various embodiments of the present disclosure provide an approach for determining an optimal time slot from a plurality of time slots for a user and improving the accuracy of the authorization process based on techniques such as ordinal regression and deep learning models. In addition, the present disclosure focuses on enhancing the business throughput of the authorization process by enforcing an authorization optimizer model to predict early approval. Further, the present disclosure focuses on the utilization of long short-term memory (LSTM) and rank consistent ordinal regression models to enhance model performance in tackling data imbalance and modifying the loss function of the model in order to force the model to push for early approvals.

FIG. 1 illustrates an exemplary representation of an environment 100 related to at least some embodiments of the present disclosure. Although the environment 100 is presented in one arrangement, other embodiments may include the parts of the environment 100 (or other parts) arranged otherwise depending on, for example, improving the accuracy of an authorization optimizer based on ordinal regression, etc. The environment 100 generally includes a server system 102, a user device 104 associated with a user 106, a merchant 108, an issuer server 112, an acquirer server 114, a payment network 116 including a payment server 118, a database 120 storing an authorization optimizer model 122, and a transaction database 124, each coupled to, and in communication with (and/or with access to) a network 110. The network 110 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 110 may include multiple different networks, such as a private network made accessible by the payment network 116 to the acquirer server 114 and the payment server 118, separately, and a public network (e.g., the Internet, etc.).

The user 106 may be any individual, representative of a corporate entity, non-profit organization, or any other person. More specifically, the user 106 may be any individual buyer and/or cardholder or any other person who is trying to perform a payment transaction to a merchant representative or other seller with a payment card or via an online interface associated with the merchant 108. The user 106 may have a payment instrument (e.g., a payment card) issued by an issuing bank (associated with the issuer server 112) and may be provided with the payment card with financial or other account information encoded onto the payment card.

The user 106 may operate the user device 104 to conduct the payment transaction through a mobile application installed on the user device 104. The user device 104 may be a smartphone, a tablet, a laptop, a computer system, or any computing device. In an example, the user device 104 may be a portable device such as a laptop, smartwatch, personal digital assistant (PDA), smartphone, and the like. In another example, the user device 104 may be a fixed device such as a desktop, workstation, and the like.

In an example, the user 106 has established card-on-file relationship with the merchant 108. The user 106 provides payment card information to the merchant 108, thereby allowing the merchant 108 to periodically charge the user 106 for a product or a service. For example, the user 106 enters the payment card information into a web browser and submits the payment card information to the merchant 108. Thereafter, the merchant 108 stores the payment card information in a database (such as the transaction database 124) and/or server. The payment card information used by the merchant 108 may include the cardholder's name as it appears on the payment card, a billing address, an account number or card number of the payment card, and/or the expiration date of the payment card. In other words, the user 106 authorizes the merchant 108 to store the card details of the user 106 and to bill the user 106 for recurring payment transactions using the stored card details.

The user 106 may have a payment account issued by an issuing bank (associated with the issuer server 112) and may be provided with the payment card with financial or other account information encoded onto the payment card such that the user 106 may use the payment card to initiate and complete a transaction using a bank account at the issuer server 112.

The issuer server 112 is a computing server that is associated with the issuer bank. The issuer bank is a financial institution that manages the accounts of multiple cardholders.

Account details of the accounts established with the issuer bank are stored in cardholder profiles of the cardholders in a memory of the issuer server 112 or on a cloud server associated with the issuer server 112. The issuer server 112 approves or denies an authorization request, and then routes, via the payment network 116, an authorization response back to the acquirer server 114. The acquirer server 114 sends the approval to the merchant 108.

The acquirer server 114 is associated with a financial institution (e.g., a bank) that processes financial transactions. This can be an institution that facilitates the processing of payment transactions for physical stores, ATM terminals, merchants, or an institution that owns platforms that make online purchases or purchases made via software applications possible (e.g., shopping cart platform providers and in-app payment processing providers). The terms "acquirer", "acquirer bank", "acquiring bank" or "acquirer server" will be used interchangeably herein in the description.

In one non-limiting example, the process of payment transactions using the payment card is facilitated by a combination of the payment server 118, the issuer server 112, and the acquirer server 114. In one embodiment, a payment transaction request is sent to the payment server 118 associated with the payment network 116 by the merchant 108 (e.g., payment terminal associated with the merchant 108 or online payment transaction request) using the network 110.

In one example, the user 106 purchases goods or services from the merchant 108 using the payment card by opting recurring payment option to pay the merchant 108. Examples of the merchant 108 may include any retail shop, restaurant, supermarket or establishment, government and/or private agencies, or any such place equipped with payment terminals, such as point-of-sale (POS) devices where buyers or cardholders visit for performing the financial transaction in exchange for any goods and/or services or any transaction that requires financial transaction between the user 106 and the merchant 108.

In this example scenario, the user 106 may use the user device 104 (e.g., a mobile phone) to access the merchant site and/or application, or a payment facilitator page associated with the merchant 108 for registering standing instructions (SI) to perform the recurring payment with the merchant 108. The user 106 may enter corresponding details related to the recurring payment such as, but not limited to, payment card details presented on the payment card, information related to the recurring payments (such as a number of debits that determine time period of recurring payments, recurring payment frequency, etc.) for registering SI mandate to perform the recurring payment to the merchant 108. In general, the user 106 may have to go through this registration process with the merchant 108 only one time for performing the recurring payment.

Upon successful registration of the SI mandate, the recurring payment transaction request may be generated by the acquirer server 114. For example, the user 106 may register SI mandate to debit its payment account between the $4^{th}$ to $15^{th}$ of every month for deduction of home loan installment. The acquirer server 114 may then generate the recurring payment request on the 4$^{th}$ of every month to deduct the recurring payment amount from the payment account of the user 106. In case sufficient funds are not present in the payment account of the user 106, the payment transaction is unsuccessful, and the acquirer server 114 may again have to generate the recurring payment request till the 15$^{th}$ of that particular month.

It is to be noted that the acquirer server 114 shall not generate too many recurring payment requests since authorization declines are generally throttled on a network (such as, the network 110) at high frequency. This, in turn, causes a lot of unnecessary traffic, eroding the performance of conventional fraud models. Therefore, once an NSF decline occurs on a payment card, the acquirer server 114 must only generate the next recurring transaction request when sufficient funds are available in the payment account of the user 106.

The environment 100 includes the server system 102 configured to perform one or more of the operations described herein. In one non-limiting example, the server system 102 is the payment server 118. The server system 102 is a separate part of the environment 100 and may operate apart from (but still in communication with, for example, via the network 110) the acquirer server 114, the payment server 118, and any third-party external servers (to access data to perform the various operations described herein). However, in other embodiments, the server system 102 may actually be incorporated, in whole or in part, into one or more parts of the environment 100, for example, the payment server 118. In addition, the server system 102 should be understood to be embodied in at least one computing device in communication with the network 110, which may be specifically configured, via executable instructions, to perform as described herein, and/or embodied in at least one non-transitory computer-readable media.

The server system 102 is configured to determine an appropriate time to generate the next recurring payment request once a non-sufficient funds (NSF) decline has been encountered on the payment account of the user 106. For example, let us consider that the acquirer server 114 associated with the merchant 108 generates the authorization request to perform recurring payments from the payment account of the user 106. In this example, sufficient funds are not available in the payment account of the user 106, and thus, the acquirer server 114 receives an authorization decline NSF error. The server system 102 is therefore configured to predict the next time interval of generating an upcoming recurring payment request such that the request is not declined, i.e., when sufficient funds are available in the payment account of the user 106.

More specifically, the server system 102 is configured to access historical transaction data (i.e., spending pattern) of the user 106 from the transaction database 124. The historical transaction data may include information about previous payment transactions (e.g., recurring payment transactions) performed at various merchants (e.g., the merchant 108). In addition, the server system 102 is configured to process the historical transaction data to predict a time interval from a plurality of time intervals. Moreover, the next or upcoming recurring payment request must be generated in the predicted time interval. The server system 102 is configured to utilize hardware-run machine learning models and/or statistical ordinal regression techniques for predicting the next time interval to generate the recurring payment transaction request.

The database 120 provides a storage location for data and/or metadata associated with an authorization optimizer model 122. In one implementation, the server system 102 is configured to run or implement the authorization optimizer model 122 to perform one or more of the operations described herein. In particular, the server system 102 is configured to run the authorization optimizer model 122 to determine an appropriate time slot from the plurality of time slots to send the upcoming recurring payment request to the payment account of the user 106.

The transaction database 124 provides a storage location for the historical transaction data associated with the user 106. It is to be noted that the server system 102 is configured to determine individual appropriate time slots for generating the upcoming recurring payment request for an individual user from various users, therefore, the transaction database 124 is configured to store the historical transaction data corresponding to various users.

In one implementation, the database 120 may be viewed, accessed, updated, and/or deleted with the facilitation of a database management system (DBMS) or relational database management system (RDBMS). Similarly, the transaction database 124 may be viewed, accessed, updated, and/or deleted with the facilitation of a DBMS or RDBMS.

In some non-limiting examples, information of the user 106, such as details of the user 106, details of the merchant 108, details of the SI transaction, and the like may be stored in a database, such as the transaction database 124. In one implementation, the database 120 is associated with the server system 102.

In one embodiment, the payment network 116 may be used by the payment card issuing authorities as a payment interchange network. The payment network 116 may include a plurality of payment servers such as, the payment server 118. Examples of payment interchange network include, but are not limited to, Mastercard® payment system interchange network. The Mastercard® payment system interchange network is a proprietary communications standard promulgated by Mastercard International Incorporated® for the exchange of financial transactions among a plurality of financial activities that are members of Mastercard International Incorporated®. (Mastercard is a registered trademark of Mastercard International Incorporated located in Purchase, N.Y.).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
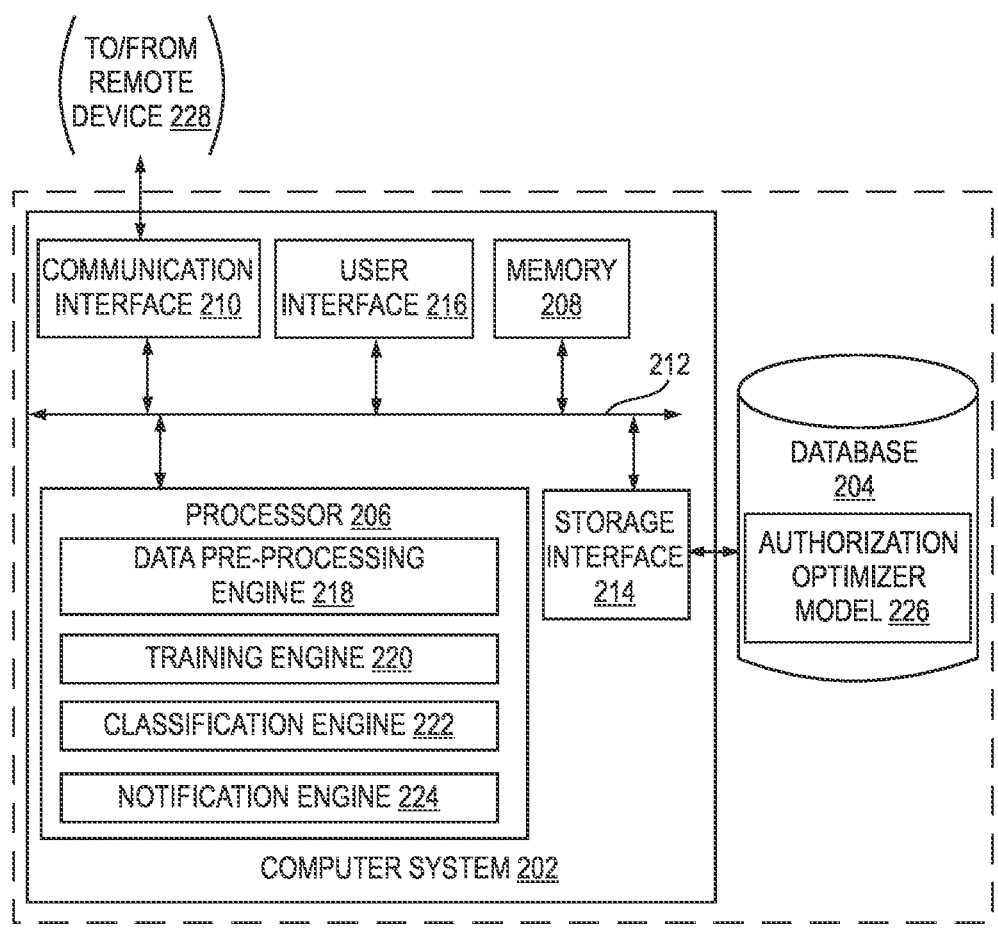
FIG. 2 is a simplified block diagram of a server system, in accordance with an embodiment of the present disclosure.

FIG. 2 is a simplified block diagram of a server system 200, in accordance with an embodiment of the present disclosure. The server system 200 is identical to the server system 102 of FIG. 1. In some embodiments, the server system 200 is embodied as a cloud-based and/or SaaS-based (software as a service) architecture.

The server system 200 includes a computer system 202 and a database 204. The computer system 202 includes at least one processor 206 for executing instructions, a memory 208, a communication interface 210, and a user interface 216 that communicates with each other via a bus 212.

In some embodiments, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In one implementation, the database 204 is configured to store an authorization optimizer model 226. The authorization optimizer model 226 is identical to the authorization optimizer model 122 of FIG. 1.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210 such that the processor 206 is capable of communicating with a remote device 228 such as, the user device 104, or communicate with any entity connected to the network 110 (as shown in FIG. 1). Further, the processor 206 is operatively coupled to the user interface 216 for determining optimal time slot for generating the upcoming recurring payment request for the user 106.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 218, a training engine 220, a classification engine 222, and a notification engine 224. It should be noted that components, described herein, such as the data pre-processing engine 218, the training engine 220, the classification engine 222, and the notification engine 224 can be configured in a variety of ways, including electronic circuitries, digital arithmetic, and logic blocks, and memory systems in combination with software, firmware, and embedded technologies. In one implementation, the processor 206 is configured to run or execute an algorithm (stored in the authorization optimizer model 226) to predict the appropriate time slot to generate upcoming recurring payment requests.

The data pre-processing engine 218 includes suitable logic and/or interfaces for receiving a Non-Sufficient Funds (NSF) error message from the acquirer server 114 associated with the merchant 108. Herein, the NSF error message indicates funds are not available in a payment account of the user 106 to complete a recurring payment transaction with the merchant 108. In response to receiving this NSF message, the data pre-processing engine 218 is configured to access historical transaction data associated with the user 106 and the plurality of users from the transaction database 124. Herein, the historical transaction data includes transaction related information associated with a plurality of users. In addition, the data pre-processing engine 218 is configured to access the historical transaction data associated with the user 106 for a period of time (e.g., 6 months, 1 year, 2 years, etc.). The historical transaction data may include transaction related information such as the date of a recurring payment transaction, amount of recurring payment transaction, recurring payment decline due to non-sufficient funds (NSF), number of days after which successful recurring payment was performed after NSF decline, and the like. It is noted that the data pre-processing engine 218 is configured to access the historical transaction data associated with a plurality of users from the transaction database 124 to train the authorization optimizer model 226.

The data pre-processing engine 218 performs the featurization process over the historical transaction data for extracting a plurality of transaction features associated with each user (for example, the user 106) of the plurality of users. Each payment transaction may include attributes such as amount, count, NSF-related features, transaction velocity features, industry, product group name, and similar features. In one implementation, all time-ordered past 30 transactions are represented as input sequences to the authorization optimizer model 226. It is to be noted that each row in the input sequence represents a single transaction, and the last row in the input sequence represents the NSF decline.

In some examples, the plurality of transaction features may include transaction velocity features for automatic teller machine (ATM), Point of Sale (POS) devices, and electronic commerce-based payment transactions for the user 106, spending patterns in merchant industries, and cross-border transaction patterns, location pattern data related to the payment transactions, etc. In some examples, the plurality of transaction features may also include card product types (such as, Standard, Platinum, etc.).

In one implementation, the data pre-processing engine 218 is configured to generate a plurality of input vectors associated with the plurality of transaction features for each user (for example, the user 106) of the plurality of users. In other words, the data pre-processing engine 218 is configured to convert the plurality of transaction features into a plurality of feature vectors (i.e., input vectors). In an example, the plurality of input vectors is generated by aggregating the historical transaction data of each user on a timely basis.

In an example, the historical transaction data represents spend transactions performed by the plurality of users across various merchant categories such as, grocery, airlines, and the like. In another example, the historical transaction data includes spending transactions performed by the plurality of users across various merchant industries such as, retail clothing, hotel industry, and the like. In yet another example, the historical transaction data includes spend transactions performed by the plurality of users across various locations where the spend transactions occurred, and payment transaction types such as, contactless, card-present, and the like.

In one implementation, the plurality of transaction features may be categorized into categorical features and numerical features. In addition, the categorical features can be converted into numerical features using one hot encoding. In general, one hot encoding is a data conversion technique used for the conversion of categorical features into numerical features. In one implementation, the historical transaction data is split into a training dataset and a test dataset. Further, the training dataset is used for training the authorization optimizer model 226 and the testing dataset is used for testing the authorization optimizer model 226.

In one example, the training dataset may include information of payment cards facing NSF recurring declines in a time interval (e.g., 1 month, 2 months, etc.). Similarly, the testing dataset may include information of payment cards facing NSF recurring declines in the time interval (e.g., 1 month, 2 months, etc.). It is noted that the plurality of transaction features is generated for both the training dataset and the testing dataset in a similar manner. In one non-limiting example, a total number of transaction features corresponds to 103 for both training and testing.

In some implementations, the data-preprocessing engine 218 is configured to perform operations (such as data-cleaning, normalization, feature extraction, and the like) on the historical transaction data of the plurality of users. In one implementation, the data pre-processing engine 218 may use natural language processing (NLP) algorithms to extract the plurality of transaction features associated with the plurality of users (e.g., the user 106) based, at least in part, on the historical transaction data.

The training engine 220 includes suitable logic and/or interfaces for training the authorization optimizer model 226 based, at least in part, on the historical transaction data. The authorization optimizer model 226 is a hardware-run machine learning model. In some non-limiting examples, the authorization optimizer model 226 may be implemented as a gradient boosting model (GBM) model, long short-term memory (LSTM) model, and the like.

In a non-limiting example, to implement the authorization optimizer model 226 as a GBM, 298 transaction features are defined. Out of which, 37 features are categorical, and 261 features are numerical. In another example, to implement the authorization optimizer model 226 as the LSTM model, 103 transaction features are defined. Out of which, 31 features are categorical, and 72 features are numerical. In addition, the LSTM input vector dimension can be defined as: one_hot (categorical)+numerical=204, where one_hot represents one hot encoding.

The training engine 220 is configured to train the authorization optimizer model 226 to further predict an optimal time slot for generating upcoming recurring payment requests for the user 106. The training engine 220 is configured to access the training dataset for the plurality of users. The training dataset may include the previous 30 payment transactions of the user 106, for each input NSF decline corresponding to a payment card. The training dataset may then be fed as an input to the authorization optimizer model 226 (e.g., LSTM network) as a 3-dimensional input, i.e., cards*transactions*features.

In one example, the authorization optimizer model 226 is trained based, at least in part, on the historical spending behavior of the user 106. The historical spending behavior may be analyzed based on features such as total spend at the plurality of merchants, transaction velocity at the plurality of merchants, largest ticket size, smallest ticket size, number of declined payment transactions due to NSF, amount of declined payment transactions due to NSF, time after which payment transactions declined due to NSF were completed successfully, and the like.

The 3-dimensional features are then passed through an LSTM classification network (i.e., the authorization optimizer model 226). The authorization optimizer model 226 is configured to analyze the historical transaction data and predict a bucket of a plurality of buckets. It is noted that the plurality of buckets is pre-defined. The plurality of buckets represents available outputs of the authorization optimizer model 226 and recommendation/prediction corresponding to the output bucket. The available outputs of the model and their corresponding recommendations are illustrated below in Table 1:

TABLE 1

Outputs of the authorization optimizer model along with their corresponding recommendations

| Model Output | Recommendation (provided as part of authorization response) |
| --- | --- |
| Approval in 0 <= days < 1 | Retry after 1 hour |
| Approval in 1 <= days <= 2 | Retry after 24 hours |
| Approval in 3 <= days <= 4 | Retry after 2 days |
| Approval in 5 <= days <= 6 | Retry after 4 days |
| Approval in 7 <= days <= 8 | Retry after 6 days |
| Approval in 9 <= days <= 10 | Retry after 8 days |
| Approval in days >= 11 | Retry after 10 days |

The authorization optimizer model 226 is then configured to output "days to retry" as one out of 7 different class labels (i.e., the plurality of buckets or the plurality of time slots). In some non-limiting examples, the plurality of time slots may be labeled as 0-1 day, 1-2 days, and so on. More specifically, the authorization optimizer model 226 tries to capture the behavior of a payment account (e.g., payment card) associated with the user 106 preceding a decline to predict the time to the next approval. For example, the authorization optimizer model 226 is configured to analyze the historical transaction data of a payment account associated with the user 106 to predict a time window or time slot in which the probability of a successful recurring payment is very high, i.e., the recurring payment will not suffer NSF decline error.

It is noted that since different class labels are ordinal in nature, the problem is formulated as an ordinal regression rather than a vanilla multi-class classification problem. In this manner, the authorization optimizer model 226 is configured to predict close to the real data points and handle the inherent class imbalance.

For example, the recommendations are classified into 7 pre-defined classes or buckets, i.e., approval between day 0 and day 1, approval between day 1 and day 2, approval between day 3 and day 4, approval between day 5 and day 6, approval between day 7 and day 8, approval between day 9 and day 10, and approval after 11 days. The authorization optimizer model 226 is configured to output only one output (i.e., only one bucket or class from these pre-defined buckets or classes) corresponding to a payment instrument of the user 106. The server system 200 is configured to transmit a specific recommendation corresponding to the output of the authorization optimizer model 226 as illustrated in Table 1.

During the training step, the training engine 220 is configured to update network parameters (e.g., weights, biases, etc.) of the LSTM network (i.e., the authorization optimizer model 226) based, at least in part, on a loss function. In the ordinal regression network, the loss function facilitates optimization of the network parameters of the network which takes into account the predicted label and ground truth label for "days to retry". It is to be noted that the objective of the training is to minimize the loss function.

The classification engine 222 includes suitable logic and/or interfaces for recommending the number of days after which the next or upcoming recurring payment request must be generated after NSF decline. For example, upon the decline of a recurring payment request generated corresponding to a payment account associated with a user (e.g., the user 106), the server system 200 is configured to run or implement the authorization optimizer model 226. The authorization optimizer model 226 is configured to access the historical transaction data associated with the user 106 from the transaction database 124. In other words, the classification engine 222 is configured to determine via the authorization optimizer model 226, an optimal time slot from a plurality of time slots for the user 106 based, at least in part, on the plurality of feature vectors (obtained from the plurality of transaction features associated with the user 106). Herein, the optimal time slot indicates an optimal time window for the acquirer server 114 to transmit an upcoming recurring payment request to the payment account of the user 106.

In an example, the historical transaction data may be accessed for an interval of time (e.g., 6 months, etc.). In another example, the historical transaction data may be accessed for x number of past transactions, where x is a natural number. In one non-limiting example, the historical transaction data may be accessed for 30 number of past transactions.

In one implementation, the server system 200 is configured to convert the historical transaction data into the plurality of transaction features. The plurality of transaction features may then be converted into the plurality of feature vectors (e.g., an input vector). The input vector is further fed as an input to the authorization optimizer model 226. Furthermore, the authorization optimizer model 226 processes or analyzes the input vector to predict "days to retry" bucket, time slot, or time window. The time window represents a number of days after which the next or upcoming recurring payment request must be generated.

In one implementation, after training, the authorization optimizer model 226 is evaluated on the testing dataset for a time interval (e.g., 1 month, 6 months, 1 year, etc.). The testing dataset is represented in a manner like that of the training dataset (i.e., cards*transactions*features). The testing data is then fed as input to the trained authorization optimizer model 226, and performance metrics are computed using predictions and ground truth labels.

In one example, the performance metrics are accuracy, accuracy 1-bucket (business-related metric), and business accuracy. In addition, accuracy 1-bucket implies that if a prediction is either spot-on or off by an early approval of 1 classification bucket, then it is considered to be a correct prediction. Further, business accuracy implies that if all predictions are either spot-on or indicate early approval by any margin, then it is considered to be a correct prediction.

The notification engine 224 includes suitable logic and/or interfaces for transmitting a notification (or notification message) to a server (e.g., the payment server 118 or the acquirer server 114). The notification engine 224 may transmit the notification via text message, web-based application, messaging application, push notification, and the like. In an instance, the notification engine 224 is configured to facilitate the transmission of the notification message to the acquirer server 114. Herein, the notification message may include the optimal time slot for the user 106. In other words, the notification may include the recommendations as shown in Table 1. In one implementation, the notification engine 224 is configured to transmit the notification to the merchant device (not shown in figures) of the merchant 108. In one example, the authorization optimizer model 226 can help the merchant 108 to determine what is the optimal time to re-try the authorization process, i.e., re-attempt the recurring payment transaction. In particular, the objective of the authorization optimizer model 226 is to predict the days to first approval on a payment account (e.g., payment card) after it faces a recurring NSF decline.

In one implementation, the recommendation may be transmitted as a part of the authorization response message. The authorization response message is transmitted as a response to the authorization request message. In one implementation, the recommendation may be transmitted in the authorization response message as De48s84 (i.e., Data element 48 subset 84).

In an example, the merchant 108 may generate an authorization request to process a recurring payment transaction on day 0. In addition, the merchant 108 may receive "transaction decline" as a response to the authorization request due to NSF decline. The merchant 108 may then request the acquirer server 114 or the payment server 118 to implement the authorization optimizer model 226. The authorization optimizer model 226 may use its intelligence to predict that sufficient funds may be available in the payment account of the user 106 after 11 days, therefore, the merchant 108 must generate the next recurring payment request (i.e., the authorization request) after 10 days.

Figure 3A:
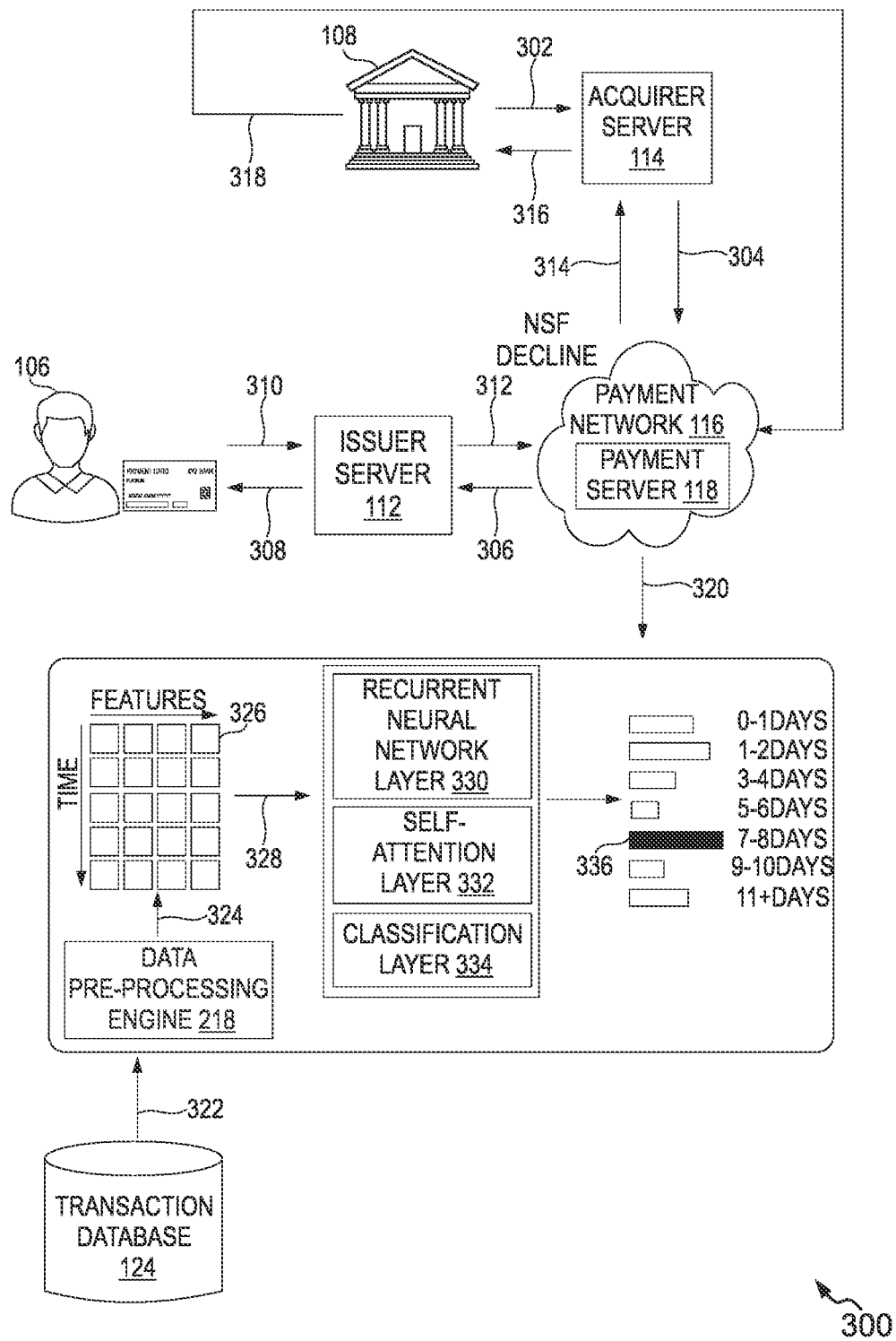
FIG. 3A is an exemplary block diagram representation of communication data flow for recommending an appropriate time window for generating the next recurring payment transaction request after non-sufficient funds (NSF) decline, in accordance with an embodiment of the present disclosure.

FIG. 3A is an exemplary block diagram representation 300 of communication data flow for recommending an appropriate time window for generating the next recurring payment transaction request after non-sufficient funds (NSF) decline, in accordance with an embodiment of the present disclosure.

Initially, the merchant 108 sends an authorization request to the acquirer server 114 to complete a recurring payment transaction request (see, 302). The acquirer server 114 then sends the authorization request to the payment network 116 or the payment server 118 (see, 304). The payment network 116 further sends the authorization request to the issuer server 112 associated with the user 106 (i.e., cardholder) (see, 306). In one example, the authorization request includes the credentials of the payment account (e.g., payment card) of the user 106. The issuer server 112 reviews the payment account of the user 106, i.e., checks whether appropriate funds (i.e., value of funds available in the payment account must be more than the value of funds to be deducted as per the authorization request) are available in the payment account of the user 106. In particular, the issuer server 112 may send a lookup request to an internal database to access information of funds available in the payment account of the user 106 (see, 308). In response to the lookup request, the issuer server 112 may receive information on funds available in the payment account of the user 106 (see, 310).

If the funds available in the payment account of the user 106 are more than the funds that are to be deducted as per the authorization request (i.e., enough funds are available in the payment account of the user 106 to cover the cost of the recurring payment), an authorization hold is made in the payment account of the user 106. With reference to FIG. 3A, if enough funds are not available in the payment account of the user 106 to cover the cost of the recurring payment;

therefore, the issuer server 112 sends an NSF-decline message to the payment network 116 (see, 312).

The payment network 116 further sends the NSF-decline message to the acquirer server 114 (see, 314). Furthermore, the acquirer server 114 sends the NSF-decline message to the merchant 108 to inform the merchant 108 that the recurring payment has not been completed successfully (see, 316). Once the merchant 108 is notified that the recurring payment request has been declined due to non-sufficient funds (NSF) available in the payment account of the user 106, a request to implement the authorization optimizer model 226 is received at the payment network 116. In an example, the merchant 108 may send a request to implement the authorization optimizer model 226 to the payment server 118 via the payment network 116 (see, 318).

The payment server 118 may then implement the authorization optimizer model 226 (see, 320). As explained above, the authorization optimizer model 226 accesses the transaction history of the user 106 from the transaction database 124 (see, 322). In an example, the authorization optimizer model 226 accesses past x number of payment transactions performed by the user 106, where x is a natural number. In another example, the authorization optimizer model 226 accesses historical payment transactions performed by the user 106 in a period of time (e.g., 3 months, 6 months, etc.). In particular, the transaction history of the user 106 may be fetched from the transaction database 124. Further, the data pre-processing engine 218 accesses the transaction history from the transaction database 124 to perform data pre-processing operations as explained above in FIG. 2. In one implementation, the data pre-processing engine 218 is configured to convert the transaction history into a plurality of transaction features. The plurality of transaction features is then fed as an input to the authorization optimizer model 226 (see, 324). With reference to FIG. 3A, the plurality of transaction features is represented in the form of an input matrix (see, 326), where features may be represented in rows and time may be represented in columns.

In addition, the input matrix is fed as an input to the authorization optimizer model 226 (see, 328). The authorization optimizer model 226 includes a recurrent neural network (RNN) layer (see, 330) as the first layer. Generally, a recurrent neural network (RNN) is a class of artificial neural networks (ANNs) where connections between nodes can create a cycle, allowing output from some nodes to affect subsequent input to the same nodes. In addition, RNN is best suited to process time-series data or sequential data.

Further, the authorization optimizer model 226 includes a self-attention layer as the second layer (see, 332). Generally, the self-attention layer takes in n number of inputs and returns n number of outputs, where n is a natural number. The self-attention layer may facilitate the neural network to assign importance or attention to specific components of the network. Furthermore, the authorization optimizer model 226 includes a classification layer (see, 334) as the third layer. The classification layer may compute the loss function for classification tasks. In particular, the classification layer may classify the optimal time slot or window from the plurality of time slots or windows, i.e., predict the optimal time duration after which the next recurring payment transaction request must be generated. With reference to FIG. 3A, the classification engine 222 predicts 7-8 days as the optimal time slot from the 7 pre-defined time slots (see, 336).

In an example, the authorization optimizer engine 226 transmits the recommendation (e.g., generate the next recurring payment request after 6 days) (based on Table 1) as a notification to the merchant 108. In one implementation, the authorization optimizer engine 226 may transmit the notification on a merchant device (not shown in figures) of the merchant 108. In one implementation, the merchant device is identical to the user device 104 of FIG. 1. Mathematically, the loss function can be computed as:

$$\text{Loss Function} = -\Sigma_{i=1}^{N} \Sigma_{k=1}^{K-1} \lambda^{(k)} [\log(\sigma(g(x_i, W) + b_k)) \\ y_i^{(k)} + \log(1 - \sigma(g(x_i, W) + b^k))(1 - y_i^{(k)})] + \beta * \Sigma_{i=1}^{N} C_{LD} \quad \text{Eqn. (1)}$$

Herein, $\Sigma_{k=1}^{K-1} f_k(x_i)$ is the rank of a bucket, N is the total number of samples, i is the index of current sample, K is the total number of slots/classes/buckets, i.e., number of the plurality of time slots (In one non-limiting instance K may be 7), input is $x_i$, output is $y_i$, number of digits in $y_i$=K−1=6 (i.e., rank encoding shown in Table 2), total number of binary classifiers=K−1=6.

Further, $\lambda^{(k)}$ represents weights for the $K^{th}$ binary classifiers. In addition, different techniques can be used to generate $\lambda^{(k)}$. It is noted that, $\lambda^{(k)}$ can be used to penalize certain classifiers more than the other classifiers (based on data distribution). Mathematically, $\lambda^{(k)}$ can be computed using any of Eqns. (2)-(4):

$$\lambda_{1:k} = \downarrow U(0.7, 0.9) \quad \text{Eqn. (2)}$$

$$\lambda_k = \frac{N}{k * N_k} \quad \text{Eqn. (3)}$$

$$\lambda_k = \frac{\sqrt{N_k}}{\sum_{k=1}^{K} \sqrt{N_k}} \quad \text{Eqn. (4)}$$

Furthermore, $y_i^{(k)}$ represents $K^{th}$ digit of ordinal target (i.e., Kth digit of rank encoding). Moreover, $y_i^{(k)}$ may represent ordered vector labels for forcing the neural network to learn order. $K^{th}$ binary classifier is $F_k$, further, σ is a logistic sigmoid function. In an instance, σ(z) may be computed mathematically as follows:

$$\sigma(z) = \frac{1}{(1 + e^{(-z)})} \quad \text{Eqn. (5)}$$

Furthermore, W represents trainable weights of the neural network, $b_k$ is bias unit added to each binary classifier, $g(x_i, W)$ is the output of second last layer of the neural network.

Where, $(1-y_i^{(k)})$ may represent K−1 BCE loss, i.e., regression turned in a fixed number of binary classifications. It is noted that the output of the model is integer-valued. The authorization optimizer model 226 can be evaluated on regression metrics such as mean squared error (MSE), mean absolute error (MAE), and the like. It is also noted that as compared to multi-class problems, the ordinal regression model tries to restrict output to nearby values rather than throwing the sample to any bucket irrespective of the cost involved.

Herein, $C_{LD}$ is the lower diagonal cost for misclassification and β is a hyper-parameter indicating weight of loss term $C_{LD}$. It is noted that the $\beta * \Sigma_{i=1}^{N} C_{LD}$ is a component of the loss function that tries to restrict the authorization optimizer model 226 to predict for early approval rather than pushing it farther away from the ground truth which is aligned to the business use case of the authorization optimizer model 226. In addition, $C_{LD}$ can be computed as:

$$C_{LD} = \max(0, f(\text{Rank}_i^{Pred} - \text{Rank}_i^{True})) \quad \text{Eqn. (6)}$$

Herein, $\text{Rank}_i^{Pred}$ is the rank of the $i^{th}$ predicted optimal time slot and $\text{Rank}_i^{True}$ is the rank of the $i^{th}$ true optimal time slot accessed from the training dataset. Further, it is noted that the $\beta * \Sigma_{i=1}^{N} C_{LD}$ component of the loss function solves the issue of reducing delayed approvals in ordinal regression. Furthermore, optimization using the loss function facilitates converging to a lower diagonal confusion matrix. Moreover, the $\beta * \Sigma_{i=1}^{N} C_{LD}$ component results in improved business accuracy by enforcing a penalty on delayed approvals. In other words, the conventional diagonal loss doesn't understand the cost of delayed prediction as there is no $C_{LD}$ whereas original diagonal loss penalizes and thereby restricts predictions to nearby buckets by using $C_{LD}$.

Figure 3B:
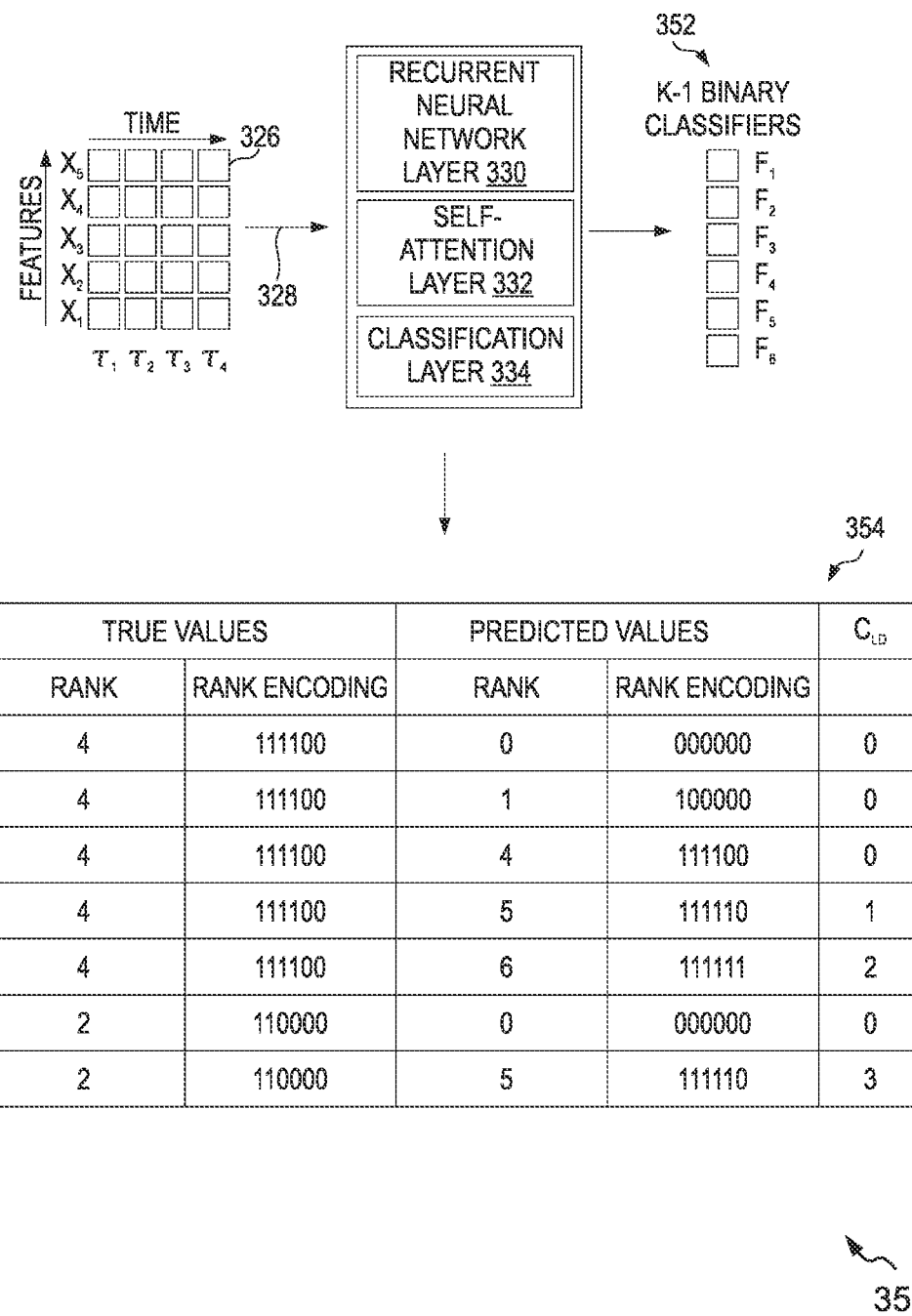
FIG. 3B illustrates a process for training the authorization optimizer model, in accordance with an embodiment of the present disclosure.

Further, FIG. 3B illustrates a process 350 for training the authorization optimizer model 226, in accordance with an embodiment of the present disclosure. As depicted, the authorization optimizer model 226 includes the Recurrent Neural Network (RNN) layer 330, a self-attention layer 332, and a classification layer 334. It is noted that herein, the value or count of the plurality of time slots is considered to be 7. As may be understood, the same is only done for the sake of explanation and should not be construed as a limitation of the present disclosure. As described earlier with reference to FIG. 3A, the plurality of transaction features can be represented in the form of an input matrix (see, 326), where features (i.e., transaction features such as $X_1$, $X_2$, $X_3$, $X_4$, and $X_5$) may be represented in rows and their corresponding time (such as $T_1$, $T_2$, $T_3$, and $T_4$) may be represented in columns. Now, if the $k^{th}$ binary classifier is $F_k$ then the authorization optimization model 226 uses its various component layers (see, 328) to generate the output as k−1 binary classifiers 352 (see, $F_1$, $F_2$, $F_4$, $F_5$, and $F_6$).

For training the authorization optimizer model 226, the server system 200 is configured to perform a set of operations iteratively till a loss function of the authorization optimization model 226 saturates. It is noted that the loss function is said to be saturated when the output value from the loss function between subsequent iterations of the authorization optimizer model 226 stops to reduce, remains constant, or reaches a predefined value.

The set of operations includes accessing a training dataset associated with the plurality of users from the transaction database 124. Then, the set of operations includes initializing the authorization optimizer model 226 based, at least in part, on one or more network parameters (e.g., weights, biases, etc.). Then, the set of operations includes generating a plurality of training features for each user of the plurality of users based, at least in part, on the training dataset. Further, the set of operations includes converting the plurality of training features into a plurality of training vectors and determining via the authorization optimizer model 226, a predicted optimal time slot based, at least in part, on the plurality of training vectors. Furthermore, the set of operations includes updating the one or more network parameters based, at least in part, on the loss function.

More specifically, updating the one or more network parameters based, at least in part, on the loss function includes accessing a true optimal time slot from the training dataset and performing a comparison between the predicted optimal time slot and the true optimal time slot using Eqn. 1, described earlier.

TABLE 2

Ranks of time slots along with their corresponding time slot encodings.

| Model Output | Recommendation (provided as part of authorization response) | Rank of Time slot | Time slot rank encoding |
|---|---|---|---|
| Approval in 0 <= days < 1 | Retry after 1 hour | 0 | 000000 |
| Approval in 1 <= days <= 2 | Retry after 24 hours | 1 | 100000 |
| Approval in 3 <= days <= 4 | Retry after 2 days | 2 | 110000 |
| Approval in 5 <= days <= 6 | Retry after 4 days | 3 | 111000 |
| Approval in 7 <= days <= 8 | Retry after 6 days | 4 | 111100 |
| Approval in 9 <= days <= 10 | Retry after 8 days | 5 | 111110 |
| Approval in days >= 11 | Retry after 10 days | 6 | 111111 |

In particular, for determining the loss value from the loss function, the rank of the predicted optimal time slot and the rank of the true optimal time slot have to be determined first. The table 354 of FIG. 3B shows an illustrative comparison between the true optimal time slot (depicted as 'TRUE VALUES') and the predicted optimal time slot (depicted as 'PREDICTED VALUES'). It is also noted that the true optimal time slot is determined based on the ground truth label for the recurring transaction. The table 354 provides various exemplary rank and rank encodings for different possibilities of true values and predicted values. Furthermore, the corresponding $C_{LD}$ computed based on Eqn. 2 is also shown in table 354. It is noted that the various values depicted in table 354 as determined from Table 2. It is understood that Table 2 provides ranks of time slots along with their corresponding time slot encodings for a non-limiting implementation.

Figure 4:
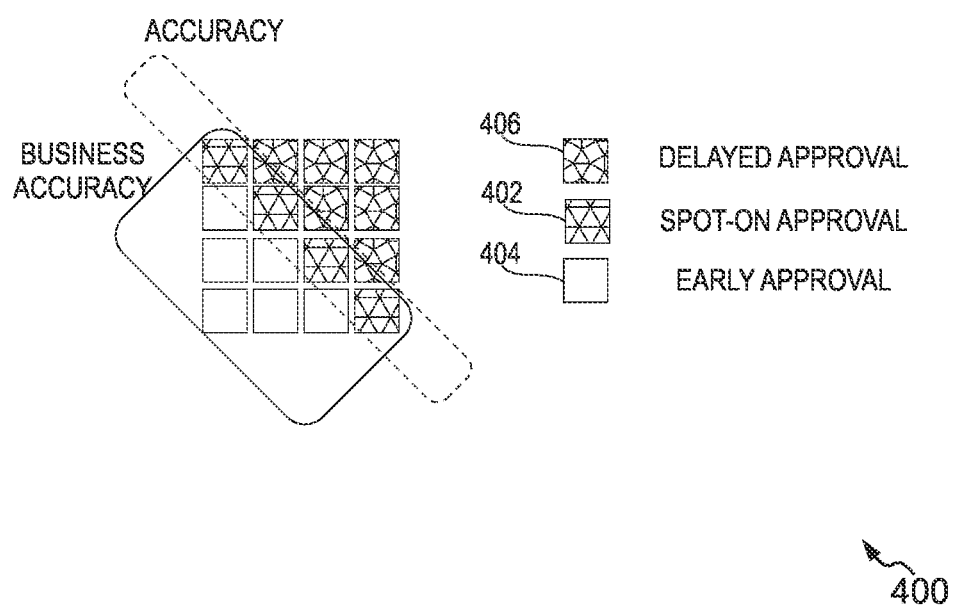
FIG. 4 is a representation of the evaluation of performance metrics of an authorization optimizer model, in accordance with an embodiment of the present disclosure.

FIG. 4 is a representation 400 of the evaluation of performance metrics of the authorization optimizer model 226, in accordance with an embodiment of the present disclosure.

With reference to FIG. 4, performance metric accuracy represents spot-on approval (see, 402), i.e., the recurring payment transaction was performed successfully, exactly when the authorization optimizer model 226 predicted to initiate the next recurring payment transaction request. For example, the authorization optimizer model 226 recommended retrying the next payment transaction request after 6 days, and exactly after 6 days, sufficient funds were available in the payment account of the user 106.

The term "spot-on approval" herein represents approvals in which the authorization optimizer model 226 predicted to re-try for the authorization process exactly on the day when sufficient funds were loaded or added into the payment account of the user 106. For example, the authorization optimizer model 226 predicts that the next recurring payment request must be generated on day 5 after NSF decline, and exactly on day 5, the recurring payment transaction is completed successfully.

In addition, performance metric business accuracy represents early approval (see, 404), i.e., the authorization optimizer model 226 predicted to retry the next recurring payment transaction request earlier than the sufficient funds were available in the payment account of the user 106. For example, the authorization optimizer model 226 predicted to retry the next recurring payment transaction request after 4 days, but sufficient funds were available in the payment account of the user 106 after 6 days.

The term "early approval" herein represents approvals in which the authorization optimizer model 226 predicted to re-try for the authorization process earlier than the day when sufficient funds were loaded or added into the payment account of the user 106. For example, the authorization optimizer model 226 predicts that the next recurring payment request must be generated on day 4 after NSF decline, but sufficient funds were added to the payment account of the user 106 after 7 days.

Further, performance metric business accuracy 1-bucket represents delayed approval (see, 406), i.e., the authorization optimizer model 226 predicted to retry the next recurring payment transaction request later than the sufficient funds were available in the payment account of the user 106. For example, the authorization optimizer model 226 predicted to retry the next recurring payment transaction request after 7 days, but sufficient funds were available in the payment account of the user 106 after 3 days only.

The term "delayed approval" herein represents approvals in which the authorization optimizer model 226 predicted to re-try for the authorization process later than the day when sufficient funds were loaded or added into the payment account of the user 106. For example, the authorization optimizer model 226 predicts that the next recurring payment request must be generated on day 8 after NSF decline, but sufficient funds were added to the payment account of the user 106 after 3 days only.

It is noted that the authorization optimization problem is treated as an ordinal regression problem instead of a multi-class classification due to the inherent order present in the target variable. This, in turn, enforces the authorization optimizer model 226 to learn the inherent ordering of the plurality of buckets. This is due to the reason that ordinal regression is expected to learn the ordering information in the target variable. In addition, the authorization optimizer model 226 tries to restrict predictions in the nearby buckets (i.e., early approval) and penalize for delayed predictions.

It is noted that the authorization optimizer model 226 may provide predictions for both early and late approvals. However, the cost associated with delayed approvals is much higher than the costs associated with early approval. Therefore, it is necessary to train the authorization optimizer model 226 to predict earlier predictions than delayed predictions. To achieve this, the authorization optimizer model 226 is penalized for delayed prediction.

Figure 5:
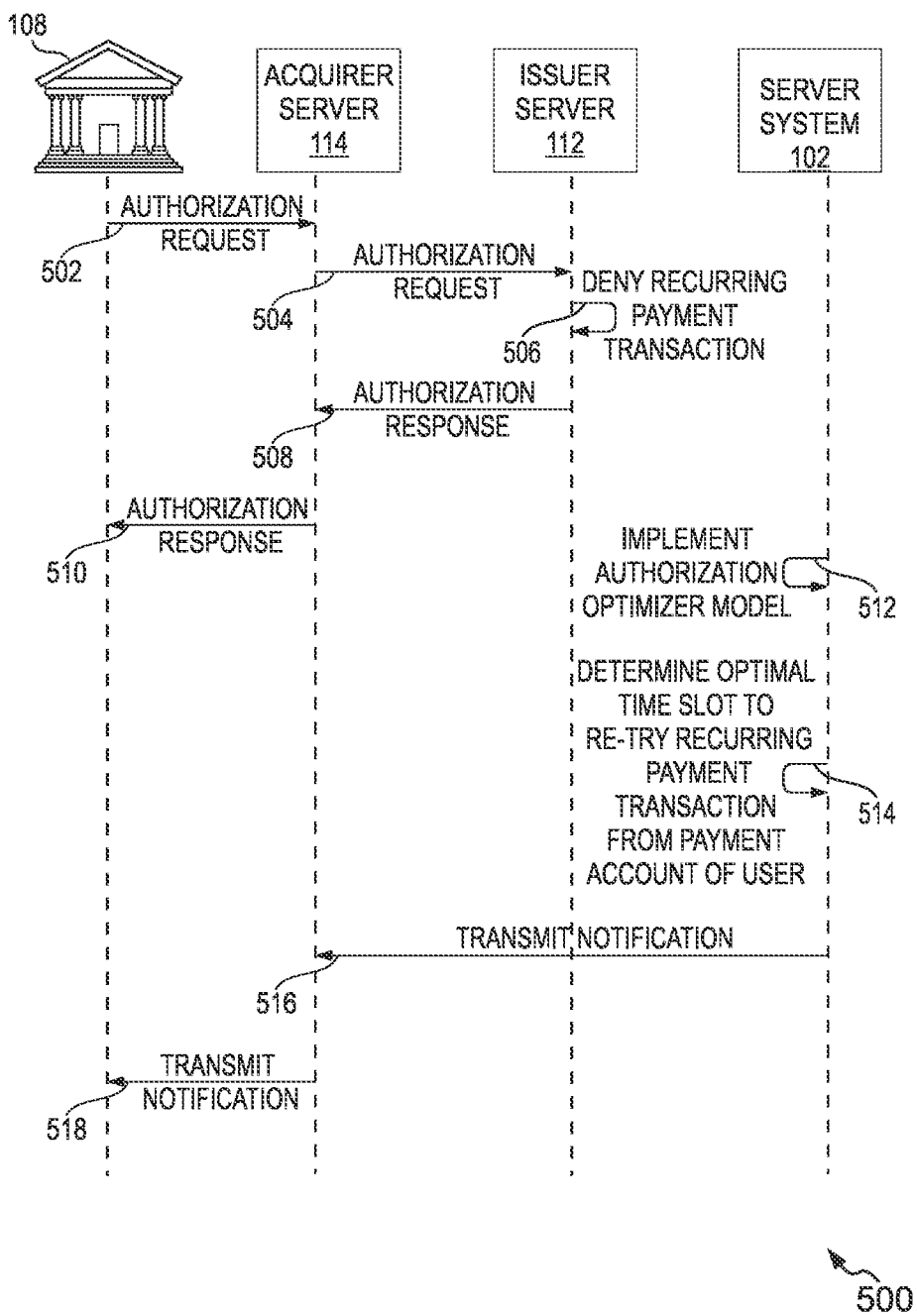
FIG. 5 is a sequence flow diagram representing recommending the optimal time slot for retrying the authorization process for a payment account of a user, in accordance with an embodiment of the present disclosure.

FIG. 5 is a sequence flow diagram 500 representing recommending the optimal time slot for retrying the authorization process for a payment account of the user 106, in accordance with an embodiment of the present disclosure. The sequence of operations of the sequence flow diagram 500 may not be necessarily executed in the same order as they are presented. Further, one or more operations may be grouped together and performed in the form of a single step, or one operation may have several sub-steps that may be performed in parallel or in a sequential manner. It is to be noted that to explain the sequence flow diagram 500, references may be made to elements described in FIG. 1 and FIG. 2.

At 502, the acquirer server 114 receives an authorization request for a recurring payment transaction from the merchant 108. In one example, the merchant 108 sends the authorization request to debit funds from the payment account of the user 106 as per already stored standing instruction (SI) registered with the merchant 108. For example, the merchant 108 has pre-stored SI to debit $100 from a payment account of the user 106 each month between the dates $5^{th}$ to $7^{th}$. Therefore, the merchant 108 may send a request to the acquirer server 114 to debit $100 from the payment account of the user 106.

For example, the cardholder (such as the user 106) has enabled card-on-file payment transactions with the merchant 108. The data associated with the card-on-file payment transactions may be stored inside a database, such as the transaction database 124. In some examples, the data may include cardholder name, cardholder billing address, amount of payment transaction, and the like. For example, the merchant 108 (e.g., a video streaming service provider) may send a request to perform a recurring payment transaction to deduct monthly charges from the user 106 in exchange for video streaming services.

At 504, the acquirer server 114 sends the authorization request to the issuer server 112 of the user 106. More specifically, the acquirer server 114 sends the authorization request to the payment network 116 or the payment server 118. Further, the payment network 116 identifies the issuer server 112 associated with the payment card of the user 106 and routes the authorization request to the issuer server 112 associated with the user 106. The issuer server 112 receives the authorization request from the acquirer server 114. It is noted that the authorization request includes information associated with the payment card of the user 106, including, for example, the issuer bank of the user 106, payment network 116 associated with the payment card, name of the cardholder, payment card number of the user 106, and the like.

At 506, the issuer server 112 denies the recurring payment transaction due to non-sufficient funds (NSF). In particular, the issuer server 112 determines whether the recurring payment transaction must be approved or denied. The issuer server 112 verifies whether the user 106 has sufficient funds available in its payment account. If sufficient funds are available in the payment account of the user 106, the issuer server 112 approves the recurring payment transaction. If sufficient funds are not available in the payment account of the user 106, the issuer server 112 denies the recurring payment transaction. With reference to FIG. 5, the issuer server 112 identifies that sufficient funds are not available in the payment account of the user 106, and therefore, the issuer server 112 denies the recurring payment transaction (or the authorization process).

At 508, the issuer server 112 sends an authorization response, such as "denied transaction due to NSF" to the acquirer server 114 associated with the merchant 108. In particular, the issuer server 112 may send a two-digit code indicating that the authorization request has been denied due to insufficient funds available in the payment account of the user 106. More specifically, the issuer server 112 may send the authorization response to the payment network 116, and the payment network 116 then transmits the authorization response to the acquirer server 114.

At 510, the acquirer server 114 may transmit the authorization response to the merchant 108. In other words, the merchant 108 is notified that the recurring payment transaction has failed due to non-sufficient funds available in the payment account of the user 106.

At 512, the server system 102 implements or runs the authorization optimizer model 226. In an embodiment, the payment server 118 sends a request to the server system 102 to run the authorization optimizer model 226 upon receiving the authorization response (e.g., failed authorization process due to NSF) from the issuer server 112. In another embodiment, the acquirer server 114 sends a request to the server system 102 to run the authorization optimizer model 226 upon receiving the authorization response (e.g., failed authorization process due to NSF) from the issuer server 112. In yet another embodiment, the acquirer server 114 sends a request to the payment server 118 to run the authorization optimizer model 226 upon receiving the authorization response (e.g., failed authorization process due to NSF) from the issuer server 112.

At 514, the server system 102 determines the optimal time slot to re-try the recurring payment transaction from the payment account of the user 106. In particular, the server system 102 predicts that sufficient funds must be available in the payment account of the user 106 after a certain number of days, and therefore, the next authorization request must be generated after a certain number of days. Table 1 illustrates the number of days after which the server system 102 must attempt to retry the recurring payment transaction from the payment account of the user 106.

At 516, the server system 102 transmits a notification to the acquirer server 114 including the optimal time slot to re-try for the authorization request. In some non-limiting examples, the server system 102 may transmit the recommendation (i.e., the optimal time slot) in the form of web-based notification, application-based notification, third-party messaging-based notification, push notification, and the like.

At 518, the acquirer server 114 may transmit the notification to the merchant 108. In one example, the acquirer server 114 may transmit the notification on a merchant device of the merchant 108.

Figure 6:
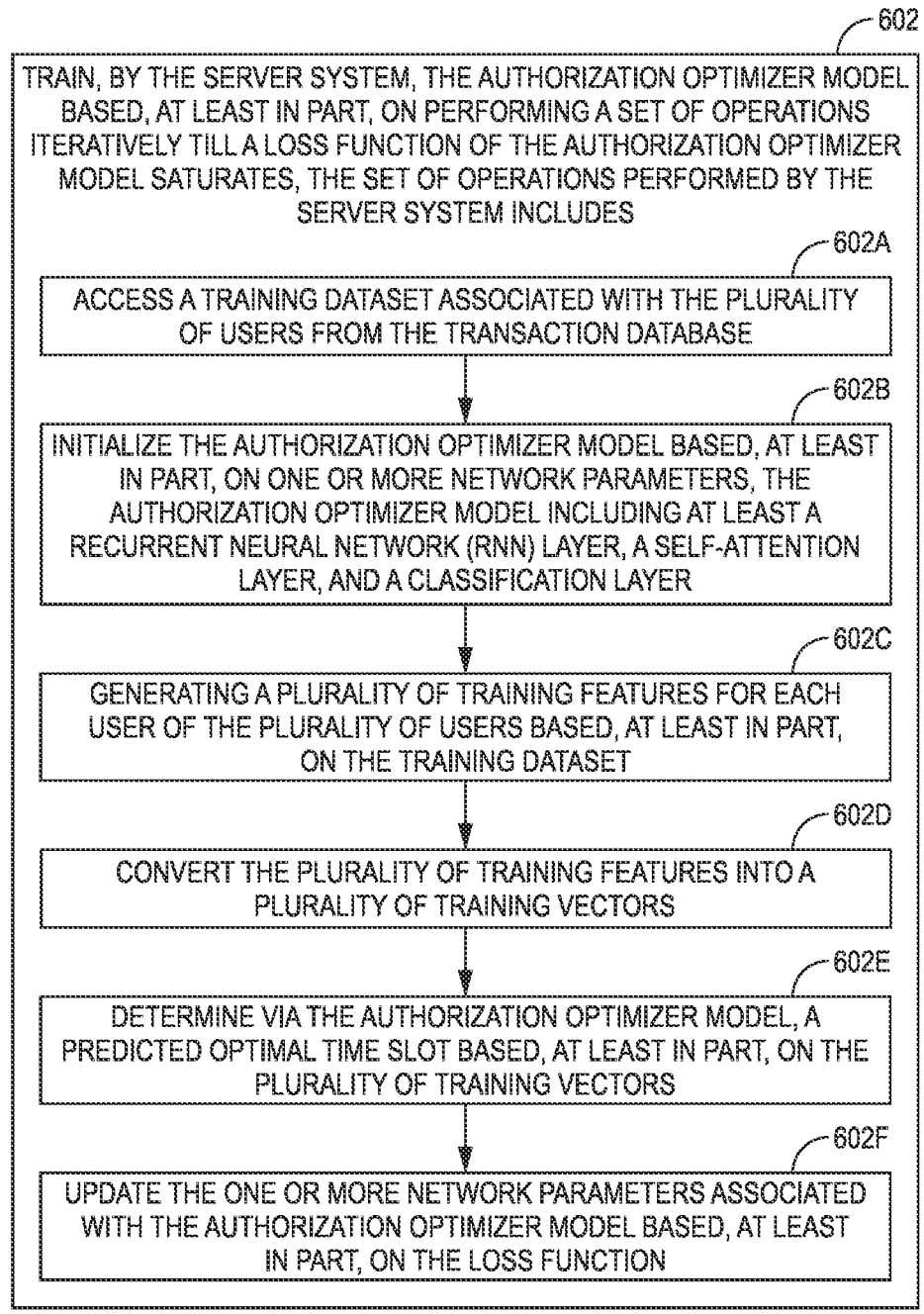
FIG. 6 is a flow diagram depicting a method for training the authorization optimizer model, in accordance with an embodiment of the present disclosure.

FIG. 6 is a flow diagram depicting a method 600 for the training of the authorization optimizer model 226, in accordance with an embodiment of the present disclosure. The method 600 depicted in the flow diagram may be executed by, for example, the server system 200 or the payment server 118. Operations of the method 600, and combinations of operation in the method 600, may be implemented by, for example, hardware, firmware, a processor, circuitry, and/or a different device associated with the execution of software that includes one or more computer program instructions. The method 600 starts at operation 602.

At operation 602, the method 600 includes training, by the server system 200, the authorization optimizer model 226 based, at least in part, on performing a set of operations iteratively till a loss function of the authorization optimizer model 226 saturates. It is noted that the loss function is considered to be saturated when the value or output generated by the loss function between subsequent iterations either minimizes, reaches a predefined stable value (i.e., saturation), or becomes constant. The set of operations performed by the server system 200 includes operations 602A-602F.

At operation 602A, the method 600 includes accessing a training dataset associated with the plurality of users from the transaction database 124. The training dataset includes information of historical payment transactions performed by the plurality of users at the plurality of merchants. The plurality of users may have utilized their respective payment accounts (e.g., payment cards) to perform payment transactions at a plurality of merchants (e.g., the merchant 108). In one implementation, the plurality of users has utilized their respective payment accounts (e.g., payment cards) to perform recurring payment transactions (i.e., register SI to perform recurring payment transactions) at the plurality of merchants (e.g., the merchant 108).

At operation 602B, the method 600 includes initializing the authorization optimizer model 226 based, at least in part, on one or more network parameters (e.g., weights, biases, etc.). As described earlier, the authorization optimizer model 226 includes at least a Recurrent Neural Network (RNN) layer, a self-attention layer, and a classification layer. In one non-limiting example, the authorization optimizer model 226 is a long short-term memory (LSTM) model. In addition, the LSTM model includes three layers including, for example, a recurrent neural network (RNN) layer, a self-attention layer, and a classification layer.

At operation 602C, the method 600 includes generating a plurality of training features for each user of the plurality of users based, at least in part, on the training dataset. The plurality of training features may include categorical features and numerical features. In one example, the categorical features may be converted into numerical features based on one hot encoding.

At operation 602D, the method 600 includes converting the plurality of training features into a plurality of training vectors. In one implementation, a training vector is generated for each cardholder (e.g., the user 106).

At operation 602E, the method 600 includes determining via the authorization optimizer model 226, a predicted optimal time slot based, at least in part, on the plurality of training vectors. In other words, the server system 200 determines an optimal time prediction for re-trying or re-generating the authorization request for the recurring payment transaction. The "optimal time" herein represents a time period when the payment account of the user 106 is loaded with sufficient funds, i.e., the authorization process must not be declined or denied again due to NSF. To that end, 'predicted optimal time slot' herein refers to a prediction made by the authorization optimizer model 226 for the optimal time duration (such as Approval in $1<=days<=2$) prediction for re-trying or re-generating the authorization request for the recurring payment transaction.

At operation 602F, the method 600 includes updating the one or more network parameters (e.g., weights, biases, etc.) associated with the authorization optimizer model 226 based, at least in part, on the loss function. More specifically, as may be understood, since the training datasets includes the ground truth label for "days to retry", or in other words, the actual optimal time slot, the predicted optimal time slot can be compared with the ground truth label to compute the output of the loss function (shown earlier with reference to Eqn. 1). It is to be noted that the objective of the training is to minimize the loss function.

The sequence of operations of the method 600 need not be necessarily executed in the same order as they are presented. Further, one or more operations may be grouped together and performed in the form of a single step, or one operation may have several sub-steps that may be performed in parallel or in a sequential manner.

Figure 7:
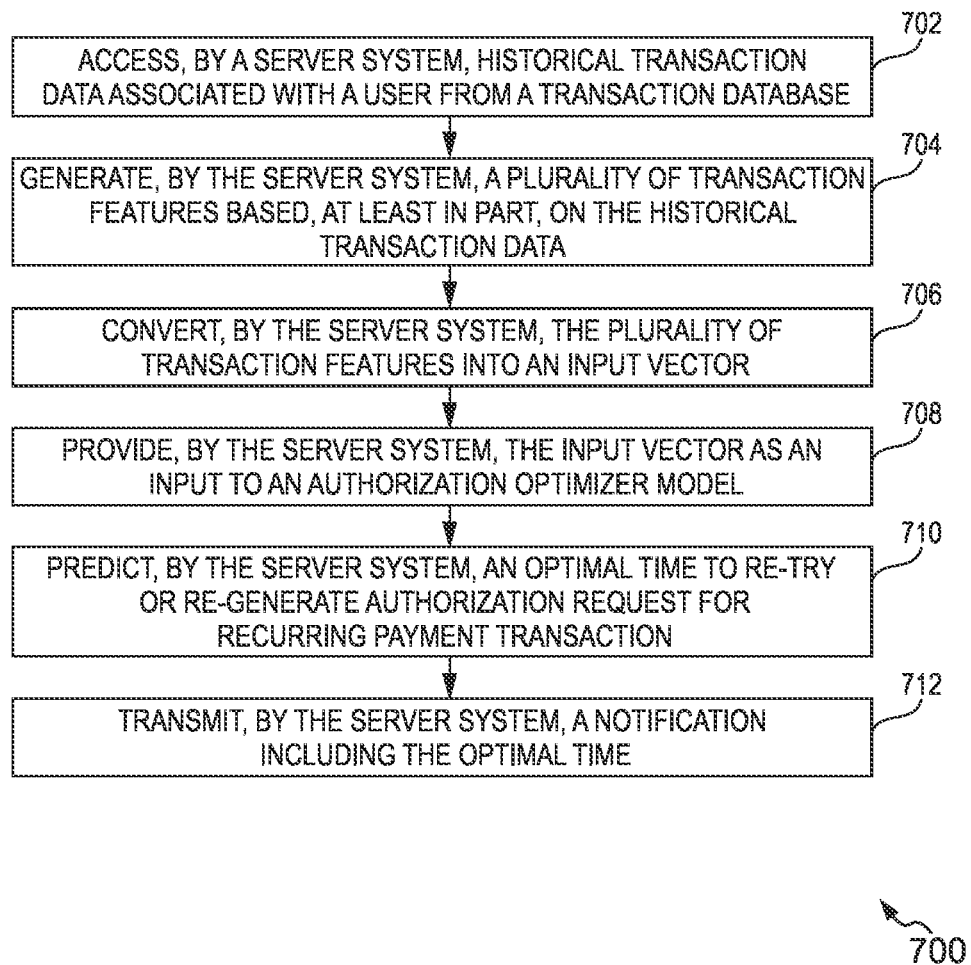
FIG. 7 is a flow diagram depicting a method for implementation of the authorization optimizer model, in accordance with an embodiment of the present disclosure.

FIG. 7 is a flow diagram depicting a method 700 for implementation of the authorization optimizer model 226, in accordance with an embodiment of the present disclosure. The method 700 depicted in the flow diagram may be executed by, for example, the server system 200 or the payment server 118. Operations of the method 700, and combinations of operations in the method 700, may be implemented by, for example, hardware, firmware, a processor, circuitry and/or a different device associated with the execution of software that includes one or more computer program instructions. The method 700 starts at operation 702.

At operation 702, the method 700 includes accessing, by the server system 200, historical transaction data associated with the user 106 from the transaction database 124. The historical transaction data includes information of historical payment transactions performed by the user 106 at the plurality of merchants (e.g., the merchant 108). In addition, the historical transaction data may include information of standing instructions (SI) registered for recurring payment transactions. The historical transaction data may also include information of past NSF declines due to non-sufficient funds available in the payment account of the user 106. Moreover, the historical transaction data includes information that past NSF decline transactions were completed successfully after how many days, i.e., after how many days sufficient funds were loaded in the payment account of the user 106 so that the recurring payment transactions could have been completed successfully.

It is noted that the historical transaction data is accessed once the card-on-file payment transaction (or scheduled recurring payment transaction) is declined due to an NSF decline error.

At operation 704, the method 700 includes generating, by the server system 200, a plurality of transaction features based, at least in part, on the historical transaction data. The plurality of transaction features may include categorical features and numerical features. In one example, the categorical features may be converted into numerical features based on one hot encoding.

At operation 706, the method 700 includes converting, by the server system 200, the plurality of transaction features into an input vector. In one implementation, the input vector is generated for the user 106. In one implementation, the plurality of transaction features may be converted into an input matrix.

At operation 708, the method 600 includes providing, by the server system 200, the input vector as an input to the authorization optimizer model 226. In one non-limiting example, the authorization optimizer model 226 is a long short-term memory (LSTM) model.

At operation 710, the method 700 includes predicting, by the server system 200, the optimal time to re-try or re-generate the authorization request for the recurring payment transaction. The "optimal time" herein represents the time period when the payment account of the user 106 must be loaded with the sufficient funds, i.e., the objective is that the authorization process must not be declined or denied again due to NSF.

At operation 712, the method 700 includes transmitting, by the server system 200, the notification including the optimal time. In an embodiment, the notification is transmitted to the acquirer server 114. In another embodiment, the notification is transmitted to the merchant device (not shown in figures) associated with the merchant 108.

The sequence of operations of the method 700 need not be necessarily executed in the same order as they are presented. Further, one or more operations may be grouped together and performed in the form of a single step, or one operation may have several sub-steps that may be performed in parallel or in a sequential manner.

Figure 8:
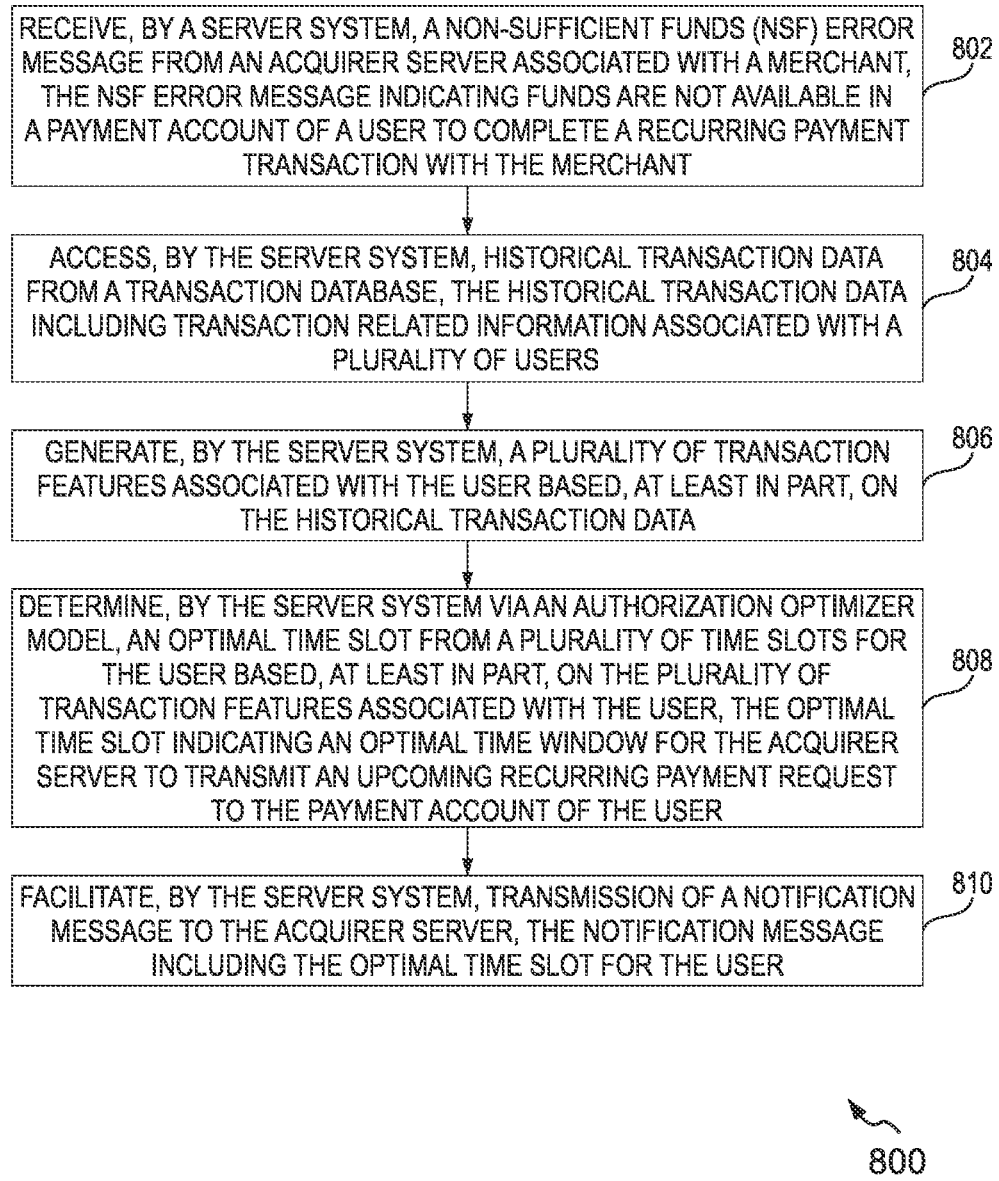
FIG. 8 is a flow diagram depicting a method for determining an optimal time slot using an authorization optimizer model, in accordance with an embodiment of the present disclosure.

FIG. 8 is a flow diagram depicting a method 800 for determining an optimal time slot using an authorization optimizer model 226, in accordance with an embodiment of the present disclosure. The method 800 depicted in the flow diagram may be executed by, for example, the server system 200 or the payment server 118. Operations of the method 800, and combinations of operations in the method 800, may be implemented by, for example, hardware, firmware, a processor, circuitry and/or a different device associated with the execution of software that includes one or more computer program instructions. The method 800 starts at operation 802.

At operation 802, the method 800 includes receiving, by a server system such as server system 200, a non-sufficient funds (NSF) error message from an acquirer server such as acquirer server 114 associated with a merchant such as merchant 108. Herein, the NSF error message indicates funds are not available in a payment account of a user such as user 106 to complete a recurring payment transaction with the merchant 108.

At operation 804, the method 800 includes accessing, by the server system 200, historical transaction data from a transaction database such as transaction database 124. Herein, the historical transaction data includes transaction related information associated with a plurality of users.

At operation 806, the method 800 includes generating, by the server system 200, a plurality of transaction features associated with the user 106 based, at least in part, on the historical transaction data.

At operation 808, the method 800 includes determining, by the server system 200 via an authorization optimizer model 226, an optimal time slot from a plurality of time slots for the user 106 based, at least in part, on the plurality of transaction features associated with the user 106. Herein, the optimal time slot indicates an optimal time window for the acquirer server 114 to transmit an upcoming recurring payment request to the payment account of the user 106.

At operation 810, the method 800 includes facilitating, by the server system 200, transmission of a notification message to the acquirer server 114, the notification message including the optimal time slot for the user 106.

The sequence of operations of the method 800 need not be necessarily executed in the same order as they are presented. Further, one or more operations may be grouped together and performed in the form of a single step, or one operation may have several sub-steps that may be performed in parallel or in a sequential manner.

Figure 9:
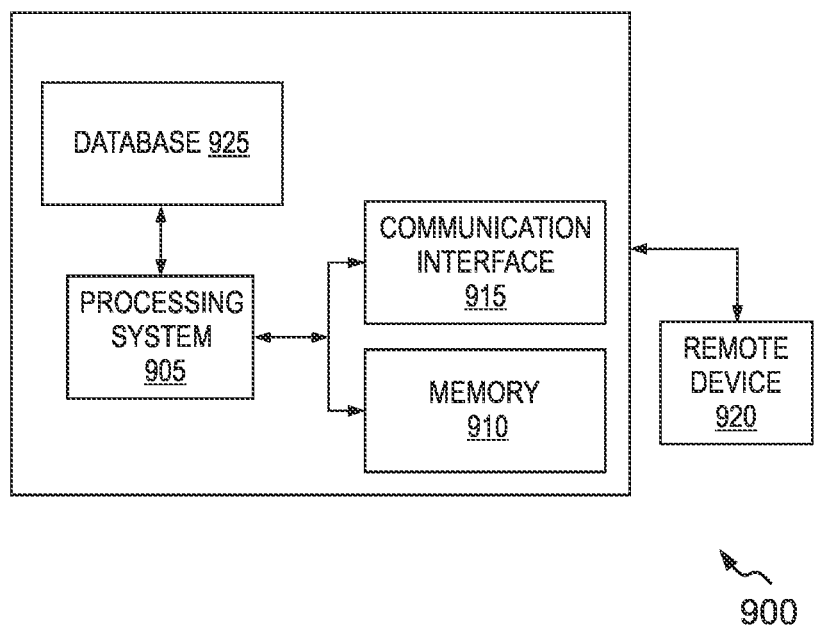
FIG. 9 is a simplified block diagram of a payment server, in accordance with an embodiment of the present disclosure.

FIG. 9 is a simplified block diagram of a payment server 900, in accordance with an embodiment of the present disclosure. The payment server 900 is an example of the payment server 118 of FIG. 1. The payment server 900 and the server system 200 may use the payment network 110 as a payment interchange network. Examples of payment interchange networks include, but are not limited to, Mastercard® payment system interchange network.

The payment server 900 includes a processing system 905 configured to extract programming instructions from a memory 910 to provide various features of the present disclosure. The components of the payment server 900 provided herein may not be exhaustive and that the payment server 900 may include more or fewer components than that depicted in FIG. 9. Further, two or more components may be embodied in one single component, and/or one component may be configured using multiple sub-components to achieve the desired functionalities. Some components of the payment server 900 may be configured using hardware elements, software elements, firmware elements, and/or a combination thereof.

Via a communication interface 915, the processing system 905 receives a request from a remote device 920, such as the issuer server 112 or the acquirer server 114. The request may be a request for conducting the payment transaction. The communication may be achieved through API calls, without loss of generality. The payment server 900 includes a database 925. The database 925 also includes transaction processing data such as issuer ID, country code, acquirer ID, and merchant identifier (MID), among others.

When the payment server 900 receives a payment transaction request from the acquirer server 114 or a payment terminal (e.g., point of sale (POS) device, etc.), the payment server 900 may route the payment transaction request to an issuer server (e.g., the issuer server 112). The database 925 stores transaction identifiers for identifying transaction details such as transaction amount, payment card details, acquirer account information, transaction records, merchant account information, and the like.

In one example, the acquirer server 114 is configured to send an authorization request message to the payment server 900. The authorization request message includes, but is not limited to, the payment transaction request.

The processing system 905 further sends the payment transaction request to the issuer server 112 for facilitating the payment transactions from the remote device 920. The processing system 905 is further configured to notify the remote device 920 of the transaction status in the form of an authorization response message via the communication interface 915. The authorization response message includes, but is not limited to, a payment transaction response received from the issuer server 112. Alternatively, in one embodiment, the processing system 905 is configured to send an authorization response message for declining the payment transaction request, via the communication interface 915, to the acquirer server 114.

Figure 10:
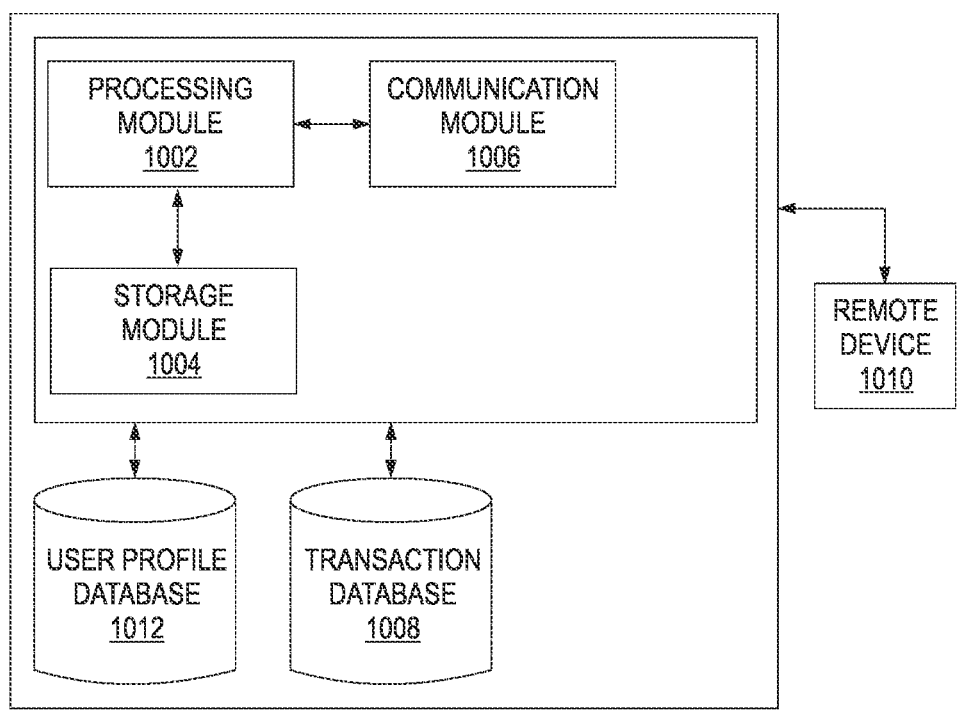
FIG. 10 illustrates a simplified block diagram of an acquirer server, in accordance with an embodiment of the present disclosure.

FIG. 10 illustrates a simplified block diagram of the acquirer server 1000, in accordance with an embodiment of the present disclosure. The acquirer server 1000 is an example of the acquirer server 114 of FIG. 1. The acquirer server 1000 is associated with an acquirer bank/acquirer, in which a merchant may have an account. The acquirer server 1000 includes a processing module 1002 operatively coupled to a storage module 1004 and a communication module 1006. The components of the acquirer server 1000 provided herein may not be exhaustive and the acquirer server 1000 may include more or fewer components than those depicted in FIG. 10. Further, two or more components may be embodied in one single component, and/or one component may be configured using multiple sub-components to achieve the desired functionalities. Some components of the acquirer server 1000 may be configured using hardware elements, software elements, firmware elements, and/or a combination thereof.

The storage module 1004 is configured to store machine-executable instructions to be accessed by the processing module 1002. Additionally, the storage module 1004 stores information related to, the contact information of the merchant, bank account number, availability of funds in the account, payment card details, transaction details, and/or the like. Further, the storage module 1004 is configured to store payment transactions.

In one embodiment, the acquirer server 1000 is configured to store profile data (e.g., an account balance, a credit line, details of the merchant such as merchant 108, account identification information) in a transaction database 1008. The details of the merchant 108 may include, but are not limited to, merchant name, age, gender, physical attributes, location, registered contact number, family information, alternate contact number, registered e-mail address, Merchant Category Code (MCC), merchant industry, merchant type, etc.

The processing module 1002 is configured to communicate with one or more remote devices such as a remote device 1010 using the communication module 1006 over a network such as the network 110 of FIG. 1. The examples of the remote device 1010 include the server system 102, the payment server 118, the issuer server 112, or other computing systems of the acquirer server 1000, and the like. The communication module 1006 is capable of facilitating such operative communication with the remote devices and cloud servers using Application Program Interface (API) calls. The communication module 1006 is configured to receive a payment transaction request performed by the cardholder or user 106 of the plurality of cardholders or users via the network 110. The processing module 1002 receives payment card information, a payment transaction amount, and cardholder information from the remote device 1010 (i.e., the payment server 118). The acquirer server 1000 includes a user profile database 1012 and the transaction database 1008 for storing transaction data. The user profile database 1012 may include information of the merchants. The transaction data may include, but is not limited to, transaction attributes, such as transaction amount, source of funds such as bank or credit cards, transaction channel used for loading funds such as POS terminal, transaction velocity features such as count and transaction amount sent in the past x days to a particular user, transaction location information, external data sources, and other internal data to evaluate each transaction.

Figure 11:
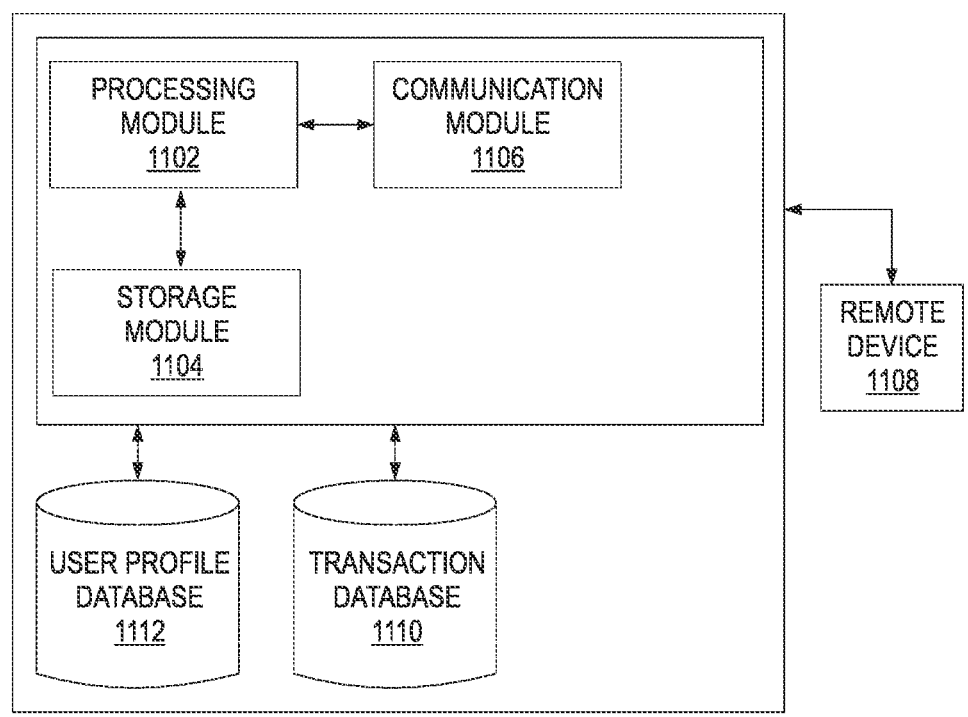
FIG. 11 illustrates a simplified block diagram of an issuer server, in accordance with an embodiment of the present disclosure.

FIG. 11 illustrates a simplified block diagram of the issuer server 1100, in accordance with an embodiment of the present disclosure. The issuer server 1100 is an example of the issuer server 112 of FIG. 1. The issuer server 1100 is associated with an issuer bank/issuer, in which an account holder such as user 106 may have an account, which provides a payment card. The issuer server 1100 includes a processing module 1102 operatively coupled to a storage module 1104 and a communication module 1106. The components of the issuer server 1100 provided herein may not be exhaustive and the issuer server 1100 may include more or fewer components than those depicted in FIG. 11. Further, two or more components may be embodied in one single component, and/or one component may be configured using multiple sub-components to achieve the desired functionalities. Some components of the issuer server 1100 may be configured using hardware elements, software elements, firmware elements, and/or a combination thereof.

The storage module 1104 is configured to store machine-executable instructions to be accessed by the processing module 1102. Additionally, the storage module 1104 stores information related to, the contact information of the cardholders (e.g., the plurality of cardholders, a bank account number, availability of funds in the account, payment card details, transaction details, payment account details, and/or the like. Further, the storage module 1104 is configured to store payment transactions.

In one embodiment, the issuer server 1100 is configured to store profile data (e.g., an account balance, a credit line, details of the cardholders, account identification information, payment card number, etc.) in a database. The details of the cardholders may include, but are not limited to, name, age, gender, physical attributes, location, registered contact number, family information, alternate contact number, registered e-mail address, or the like of the cardholders, etc.

The processing module 1102 is configured to communicate with one or more remote devices such as a remote device 1108 using the communication module 1106 over a network such as the network 110 of FIG. 1. Examples of the remote device 1108 include the server system 200, the payment server 118, the acquirer server 114 or other computing systems of the issuer server 1100. The communication module 1106 is capable of facilitating such operative communication with the remote devices and cloud servers using API calls. The communication module 1106 is configured to receive a payment transaction request performed by an account holder via the network 110. The processing module 1102 receives payment card information, a payment transaction amount, customer information, and merchant information from the remote device 1108 (e.g., the payment server 118). The issuer server 1100 includes a transaction database 1110 for storing transaction data. The transaction data may include, but is not limited to, transaction attributes, such as transaction amount, source of funds such as bank or credit cards, transaction channel used for loading funds such as POS terminal or ATM machine, transaction velocity features such as count and transaction amount sent in the past x days to a particular account holder, transaction location information, external data sources, and other internal data to evaluate each transaction. The issuer server 1100 includes a user profile database 1112 storing user profiles associated with the plurality of account holders.

The user profile data may include an account balance, a credit line, details of the account holders, account identification information, payment card number, or the like. The details of the account holders may include, but are not limited to, name, age, gender, physical attributes, location, registered contact number, family information, alternate contact number, registered e-mail address, or the like of the cardholders or users.

The disclosed methods with reference to FIGS. 1 to 8, or one or more operations of the methods 600, 700, and 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Webbook, tablet computing device, smartphone, or other mobile computing devices)). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal-oxide-semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 (e.g., the server system 102) and its various components such as the computer system 202 and the database 204 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), Digital Versatile Disc (DVD), BLU-RAY® Disc (BD), and semiconductor memories (such as mask ROM, programmable ROM (PROM), erasable PROM (EPROM), flash memory, random access memory (RAM), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system, a Non-Sufficient Funds (NSF) error message from an acquirer server associated with a merchant, the NSF error message indicating funds are not available in a payment account of a user to complete a recurring payment transaction with the merchant;
accessing, by the server system, historical transaction data from a transaction database, the historical transaction data comprising one or more transaction related information associated with a plurality of users;
generating, by the server system, a plurality of transaction features associated with the user based, at least in part, on the historical transaction data;
determining, by the server system via an authorization optimizer model, an optimal time slot from a plurality of time slots for the user based, at least in part, on the plurality of transaction features associated with the user, wherein the authorization optimizer model includes a recurrent neural network (RNN) layer configured to process time-ordered sequences of transaction data, a self-attention layer configured to assign importance to specific components of the transaction data, and a classification layer, wherein the authorization optimizer model is configured to treat an authorization optimization as an ordinal regression problem to learn inherent ordering of the plurality of time slots, restrict predictions to nearby time slots, and penalize delayed predictions, the optimal time slot indicating an optimal time window for the acquirer server to transmit an upcoming recurring payment request to the payment account of the user;
training, by the server system, the authorization optimizer model based, at least in part, on performing a set of operations iteratively till a loss function of the authorization optimizer model saturates; and
facilitating, by the server system, transmission of a notification message to the acquirer server, the notification message comprising the optimal time slot for the user.

2. The computer-implemented method as claimed in claim 1, wherein the transaction related information associated with the plurality of users comprises a date of a recurring payment transaction, an amount of recurring payment transaction, a recurring payment decline due to NSF, and a number of days after which successful recurring payment was performed after NSF decline.

3. The computer-implemented method as claimed in claim 1, wherein the plurality of transaction features comprises transaction velocity features for an Automatic Teller Machine (ATM), a Point of Sale (POS) device, electronic commerce-based payment transactions for the user, spending patterns in merchant industries, cross-border transaction pattern, location pattern data related to payment transactions, and card product type.

4. The computer-implemented method as claimed in claim 1, wherein determining the optimal time slot, further comprises:
converting, by the server system, the plurality of transaction features into a plurality of feature vectors; and
determining, by the server system via the authorization optimizer model, the optimal time slot from the plurality of time slots for the user based, at least in part, on the plurality of feature vectors.

5. The computer-implemented method as claimed in claim 1, further comprising:
training the set of operations comprising:
accessing a training dataset associated with the plurality of users from a transaction dataset;
initializing the authorization optimizer model based, at least in part, on one or more network parameters;
generating a plurality of training features for each user of the plurality of users based, at least in part, on the training dataset;
converting the plurality of training features into a plurality of training vectors;
determining via the authorization optimizer model, a predicted optimal time slot based, at least in part, on the plurality of training vectors; and
updating the one or more network parameters based, at least in part, on the loss function.

6. The computer-implemented method as claimed in claim 5, wherein the loss function is computed as:

$$\text{Loss Function} = -\Sigma_{i=1}^{N}\Sigma_{k=1}^{K-1}\lambda^{(k)}[\log(\sigma(g(x_i,W)+b_k)) \\ y_i^{(k)} + \log(1-\sigma(g(x_i,W)+b^k))(1-y_i^{(k)}] + \beta^*\Sigma_{i=1}^{N} C_{LD}$$

wherein, K is a number of the plurality of time slots, N is a total number of samples, i is an index of current sample, input is $x_i$, output is $y_i$, $\lambda^{(k)}$ represents weights for $K^{th}$ binary classifiers, $y_i^{(k)}$ represents $K^{th}$ digit of ordinal target, $\sigma$ is a logistic sigmoid function, W represents trainable weights of a neural network, $b_k$ is a bias unit added to each binary classifier, $g(x_i, W)$ is an output of second last layer of the neural network, $C_{LD}$ is a lower diagonal cost for misclassification and $\beta$ is a hyper-parameter indicating weight of $C_{LD}$.

7. The computer-implemented method as claimed in claim 6, wherein the $C_{LD}$ is computed as:

$$C_{LD} = \max(0, f(\text{Rank}_i^{Pred} - \text{Rank}_i^{True})) \qquad \text{Eqn. (6)}$$

wherein, $\text{Rank}_i^{Pred}$ is the rank of $i^{th}$ predicted optimal time slot and $\text{Rank}_i^{True}$ is the rank of $i^{th}$ true optimal time slot accessed from the training dataset.

8. The computer-implemented method as claimed in claim 1, wherein the authorization optimizer model is implemented as one of a gradient boosting model (GBM) and a long short-term memory (LSTM) model.

9. The computer-implemented method as claimed in claim 1, wherein the server system is a payment server associated with a payment network.

10. A server system, comprising:
a memory configured to store instructions;
a communication interface; and
a processor in communication with the memory and the communication interface, the processor configured to execute the instructions stored in the memory and thereby cause the server system to perform at least in part to:
receive a Non-Sufficient Funds (NSF) error message from an acquirer server associated with a merchant, the NSF error message indicating funds are not available in a payment account of a user to complete a recurring payment transaction with the merchant;
access historical transaction data from a transaction database, the historical transaction data comprising one or more transaction related information associated with a plurality of users;
generate a plurality of transaction features associated with the user based, at least in part, on the historical transaction data;
determine via an authorization optimizer model, an optimal time slot from a plurality of time slots for the user based, at least in part, on the plurality of transaction features associated with the user, wherein the authorization optimizer model includes a recurrent neural network (RNN) layer configured to process time-ordered sequences of transaction data, a self-attention layer configured to assign importance to specific components of the transaction data, and a classification layer, wherein the authorization optimizer model is configured to treat an authorization optimization as an ordinal regression problem to learn inherent ordering of the plurality of time slots, restrict predictions to nearby time slots, and penalize delayed predictions, the optimal time slot indicating an optimal time window for the acquirer server to transmit an upcoming recurring payment request to the payment account of the user;

training via the server system, the authorization optimizer model based, at least in part, on performing a set of operations iteratively till a loss function of the authorization optimizer model saturates; and facilitate transmission of a notification message to the acquirer server, the notification message comprising the optimal time slot for the user.

11. The server system as claimed in claim 10, wherein the transaction related information associated with the plurality of users comprises a date of a recurring payment transaction, an amount of recurring payment transaction, a recurring payment decline due to NSF, and a number of days after which successful recurring payment was performed after NSF decline.

12. The server system as claimed in claim 10, wherein the plurality of transaction features comprises transaction velocity features for an Automatic Teller Machine (ATM), a Point of Sale (POS) device, electronic commerce-based payment transactions for the user, spending patterns in merchant industries, cross-border transaction pattern, location pattern data related to payment transactions, and card product type.

13. The server system as claimed in claim 10, wherein to determine the optimal time slot, the server system is further caused to:

convert the plurality of transaction features into a plurality of feature vectors; and determine via the authorization optimizer model, the optimal time slot from the plurality of time slots for the user based, at least in part, on the plurality of feature vectors.

14. The server system as claimed in claim 10, wherein the server system is further caused to:

train the authorization optimizer model based, at least in part, on performing operations comprising:

accessing a training dataset associated with the plurality of users from a transaction dataset;

initializing the authorization optimizer model based, at least in part, on one or more network parameters;

generating a plurality of training features for each user of the plurality of users based, at least in part, on the training dataset;

converting the plurality of training features into a plurality of training vectors;

determining via the authorization optimizer model, a predicted optimal time slot based, at least in part, on the plurality of training vectors; and updating the one or more network parameters based, at least in part, on the loss function.

15. The server system as claimed in claim 14, wherein the loss function is computed as:

$$\text{Loss Function} = -\Sigma_{i=1}^{N} \Sigma_{k=1}^{K-1} \lambda^{(k)} [\log(\sigma(g(x_i, W) + b_k)) y_i^{(k)} + \log(1 - \sigma(g(x_i, W) + b^k))(1 - y_i^{(k)})] + \beta * \Sigma_{i=1}^{N} C_{LD}$$

wherein, K is a number of the plurality of time slots, N is a total number of samples, i is an index of current sample, input is $x_i$, output is $y_i$, $\lambda^{(k)}$ represents weights for $K^{th}$ binary classifiers, $y_i^{(k)}$ represents $K^{th}$ digit of ordinal target, σ is a logistic sigmoid function, W represents trainable weights of a neural network, $b_k$ is a bias unit added to each binary classifier, $g(x_i, W)$ is an output of second last layer of the neural network, $C_{LD}$ is a lower diagonal cost for misclassification and β is a hyper-parameter indicating weight of $C_{LD}$.

16. The server system as claimed in claim 15, wherein the $C_{LD}$ is computed as:

$$C_{LD} = \max(0, f(\text{Rank}_i^{Pred} - \text{Rank}_i^{True})) \qquad \text{Eqn. (6)}$$

wherein, $\text{Rank}_i^{Pred}$ is the rank of $i^{th}$ predicted optimal time slot and $\text{Rank}_i^{True}$ is the rank of $i^{th}$ true optimal time slot accessed from the training dataset.

17. A non-transitory computer-readable storage medium comprising computer-executable instructions that, when executed by at least a processor of a server system, cause the server system to perform a method comprising:

receiving a Non-Sufficient Funds (NSF) error message from an acquirer server associated with a merchant, the NSF error message indicating funds are not available in a payment account of a user to complete a recurring payment transaction with the merchant;

accessing historical transaction data from a transaction database, the historical transaction data comprising one or more transaction related information associated with a plurality of users;

generating a plurality of transaction features associated with the user based, at least in part, on the historical transaction data;

determining via an authorization optimizer model, an optimal time slot from a plurality of time slots for the user based, at least in part, on the plurality of transaction features associated with the user, wherein the authorization optimizer model includes a recurrent neural network (RNN) layer configured to process time-ordered sequences of transaction data, a self-attention layer configured to assign importance to specific components of the transaction data, and a classification layer, wherein the authorization optimizer model is configured to treat an authorization optimization as an ordinal regression problem to learn inherent ordering of the plurality of time slots, restrict predictions to nearby time slots, and penalize delayed predictions, the optimal time slot indicating an optimal time window for the acquirer server to transmit an upcoming recurring payment request to the payment account of the user;

training, by the server system, the authorization optimizer model based, at least in part, on performing a set of operations iteratively till a loss function of the authorization optimizer model saturates; and facilitating transmission of a notification message to the acquirer server, the notification message comprising the optimal time slot for the user.

18. The non-transitory computer-readable storage medium as claimed in claim 17, wherein for determining the optimal time slot, the method further comprises:

converting the plurality of transaction features into a plurality of feature vectors; and determining via the authorization optimizer model, the optimal time slot from the plurality of time slots for the user based, at least in part, on the plurality of feature vectors.

19. The non-transitory computer-readable storage medium as claimed in claim 17, wherein the method further comprises:
    training the authorization optimizer model based on the set of operations comprising:
    accessing a training dataset associated with the plurality of users from a transaction dataset;
    initializing the authorization optimizer model based, at least in part, on one or more network parameters, the authorization optimizer model comprising a Recurrent Neural Network (RNN) layer, a self-attention layer, and a classification layer;
    generating a plurality of training features for each user of the plurality of users based, at least in part, on the training dataset;
    converting the plurality of training features into a plurality of training vectors;
    determining via the authorization optimizer model, a predicted optimal time slot based, at least in part, on the plurality of training vectors; and
    updating the one or more network parameters based, at least in part, on the loss function.

20. The non-transitory computer-readable storage medium as claimed in claim 17, wherein the loss function is computed as:

$$\text{Loss Function} = -\Sigma_{i=1}^{N}\Sigma_{k=1}^{K-1}\lambda^{(k)}[\log(\sigma(g(x_i,W)+b_k))y_i^{(k)}+\log(1-\sigma(g(x_i,W)+b^k))(1-y_i^{(k)})]+\beta*\Sigma_{i=1}^{N}C_{LD}$$

wherein, K is a number of the plurality of time slots, N is a total number of samples, i is an index of current sample, input is $x_i$, output is $y_i$, $\lambda^{(k)}$ represents weights for Kth binary classifiers, $y_i^{(k)}$ represents $K^{th}$ digit of ordinal target, $\sigma$ is a logistic sigmoid function, W represents trainable weights of a neural network, $b_k$ is a bias unit added to each binary classifier, $g(x_i, W)$ is an output of second last layer of the neural network, $C_{LD}$ is a lower diagonal cost for misclassification and $\beta$ is a hyper-parameter indicating weight of $C_{LD}$, wherein the $C_{LD}$ is computed as:

$$C_{LD}=\max(0,f(\text{Rank}_i^{Pred}-\text{Rank}_i^{True})) \qquad \text{Eqn. (6)}$$

wherein, $\text{Rank}_i^{Pred}$ is the rank of $i^{th}$ predicted optimal time slot and $\text{Rank}_i^{True}$ is the rank of $i^{th}$ true optimal time slot accessed from a training dataset.

* * * * *